United States Patent
Kraus et al.

(10) Patent No.: US 11,794,355 B2
(45) Date of Patent: Oct. 24, 2023

(54) METHODS AND SYSTEMS FOR AUTOMATIC CONTROL OF BULK MATERIAL REMOVAL

(71) Applicant: DEERE & COMPANY, Moline, IL (US)

(72) Inventors: Timothy J. Kraus, Blakesburg, IA (US); Austin J. Karst, Ottumwa, IA (US)

(73) Assignee: Deere & Company, Moline, IL (US)

( * ) Notice: Subject to any disclaimer, the term of this patent is extended or adjusted under 35 U.S.C. 154(b) by 562 days.

(21) Appl. No.: 16/859,391

(22) Filed: Apr. 27, 2020

(65) Prior Publication Data

US 2021/0331329 A1    Oct. 28, 2021

(51) Int. Cl.
| | |
|---|---|
| *A01F 25/20* | (2006.01) |
| *B25J 13/08* | (2006.01) |
| *B25J 5/00* | (2006.01) |
| *B25J 9/14* | (2006.01) |
| *B25J 15/00* | (2006.01) |
| *B25J 18/02* | (2006.01) |

(52) U.S. Cl.
CPC ......... *B25J 13/089* (2013.01); *A01F 25/2027* (2013.01); *B25J 5/00* (2013.01); *B25J 9/144* (2013.01); *B25J 15/0019* (2013.01); *B25J 18/02* (2013.01); *A01F 2025/2081* (2013.01)

(58) Field of Classification Search
CPC ...................... A01F 25/2027; A01F 2025/2081
See application file for complete search history.

(56) References Cited

U.S. PATENT DOCUMENTS

| | | | | |
|---|---|---|---|---|
| 3,847,266 | A * | 11/1974 | Cox .................... | A01F 25/2027 198/511 |
| 4,157,164 | A * | 6/1979 | Helm .................. | A01F 25/2027 241/101.74 |
| 4,243,346 | A * | 1/1981 | Wolf .................... | A01F 25/2027 406/76 |
| 6,505,786 | B2 * | 1/2003 | Van Der Plas ..... | A01F 25/2027 241/101.8 |
| 6,591,971 | B1 * | 7/2003 | Sheahan ............. | A01F 25/2027 198/304 |

(Continued)

FOREIGN PATENT DOCUMENTS

| | | |
|---|---|---|
| DE | 19855082 A1 | 6/2000 |
| EP | 2692224 A2 | 2/2014 |

(Continued)

OTHER PUBLICATIONS

Extended European Search Report and Written Opinion issued in European Patent Application No. 21169186.0, dated Sep. 22, 2021, in 08 pages.

*Primary Examiner* — Jonathan Snelting

(57) ABSTRACT

Systems and method for forming a stable silo face in bulk material are disclosed. Particularly, systems and methods for forming a negative rake angle in a silo face of bulk silage are disclosed. Rotation of an articulated arm (e.g., raising and lowering), altering a length of the articulated arm (e.g., extension or retraction), and movement of a machine relative to the silo face (towards and away from) may be automatically controlled to form the negative rake angle. Different implementations contemplate automated control of all or fewer than all of these operations.

5 Claims, 10 Drawing Sheets

(56) References Cited

U.S. PATENT DOCUMENTS

| | | | |
|---|---|---|---|
| 6,814,322 B1 * | 11/2004 | Slaby | A01F 25/2027 |
| | | | 241/101.77 |
| 10,401,867 B2 * | 9/2019 | Strautmann | G05D 1/024 |

FOREIGN PATENT DOCUMENTS

| | | |
|---|---|---|
| EP | 2842411 A2 | 3/2015 |
| EP | 3132674 A1 | 2/2017 |

* cited by examiner

METHODS AND SYSTEMS FOR AUTOMATIC CONTROL OF BULK MATERIAL REMOVAL

FIELD OF THE DISCLOSURE

The present disclosure relates generally to silage and, particularly, to silage storage.

BACKGROUND OF THE DISCLOSURE

To preserve animal feed without fully drying, vegetation is stored in a reduced oxygen environment, usually in a silo. Placement within a silo results in compression of the vegetation, which, in turn, operates to purge oxygen from the vegetation. In an oxygen-free environment, microorganisms included with the vegetation cause the vegetation to ferment. The fermentation causes the vegetation to become acidic, which resists spoilage and promotes longevity of the vegetation for subsequent use as animal feed. The fermentation and storage process is called ensilage.

SUMMARY OF THE DISCLOSURE

A first aspect of the present disclosure is directed to a computer-implemented method preformed by one or more processors for automatically facing bulk material. The method may include engaging a defacer with a silo face of a bulk material and displacing the defacer to move across the silo face of the bulk material to define a negative rake angle in the silo face.

Another aspect of the present disclosure is directed to system for forming silo face of a bulk material with a negative rake angle. The system may include a machine that includes a frame and an articulating arm pivotably coupled to the frame; a defacer coupled to a distal end of the articulating arm; a controller communicably coupled to the machine that controls the articulating arm to define a negative rake angle in the silo face of the bulk material.

The various aspects of the present disclosure may include one or more of the following features. A selected angle may be received, and the defacer may be displaced to move across the silo face of the bulk material to define a negative rake angle in the silo face may include forming the negative rake angle in the silo face having the selected angle. The defacer may be coupled to an end of an articulating arm of a machine. Engaging a defacer with a silo face of a bulk material may include at least one of extending the articulating arm until contact between the defacer and the silo face is detected or advancing the machine unit contact between the defacer and the silo face is detected. Displacing the defacer to move across the silo face of the bulk material to define the silo face to have a negative rake angle may include, with the use of a controller, one of raising the articulating arm while simultaneously extending the articulating arm and lowering the articulating arm while simultaneously retracting the articulating arm to define the negative rake angle. Raising the articulating arm may include pivoting the articulating arm relative to a body of the machine away from a horizontal position and towards a vertical position. Lowering the articulating arm may include pivoting the articulating arm relative to the body of the machine away from a vertical position and towards a horizontal position. Displacing the defacer to move across the silo face of the bulk material to define a negative rake angle may include, with the use of a controller, simultaneously moving the machine relative to the silo face in combination with pivoting the articulating arm to cause the defacer to move across the silo face of the bulk material to define the negative rake angle in the silo face. Moving the machine relative to the silo face in combination with pivoting the articulating arm to cause the defacer to move across the silo face of the bulk material to define the negative rake angle in the silo face may include one of operating a drive system of the machine to advance the machine towards the silo face while simultaneously raising the articulating arm or operating the drive system of the machine to withdraw the machine from the silo face while simultaneously lowering the articulating arm to form the negative rake angle in the silo face of the bulk material. Bulk material removed while defining the negative rake angle in the silo face may be collected. Displacing the defacer to move across the silo face of the bulk material to define a negative rake angle in the silo face may include detecting a position of the defacer relative to the silo face of the bulk material. Detecting a position of the defacer relative to the silo face of the bulk material may include computing a position of the defacer using sensed position information of the machine relative to the silo face received from a position sensor, sensed rotation information of an amount of rotation of the articulating arm from a rotation sensor, or sensed length information of the articulating arm representing an amount by which the articulating arm is extended or retracted from a length sensor.

The various aspects of the present disclosure may also include one or more of the following features. The controller may simultaneously control pivoting and extension of the articulating arm to define the negative rake angle in the silo face of the bulk material. A first sensor that senses a pivoting angle of the articulating arm and a second sensor that senses an amount of extension of the articulating arm may be included. The controller may control pivoting of the articulating arm using the sensed pivoting angle from the first sensor and the sensed amount of extension from the second sensor. The controller may simultaneously control movement of the machine relative to the silo face and pivoting of the articulating arm to define the negative rake angle in the silo face of the bulk material. A sensor that detects a position of the machine relative to the silo face of the bulk material may be included. The controller may control movement of the machine relative to the silo face using position information from the sensor. The controller may control movement of the machine by operating a drive system of the machine. The controller may at least one of simultaneously raise the articulating arm and control the drive system of the machine to advance the machine towards the silo face of the bulk material and lower the articulating arm and control the drive system to withdraw the machine from the silo face of the bulk material to form the negative rake angle in the silo face. The defacer may be a rotary defacer. The defacer may be a rake-type defacer.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
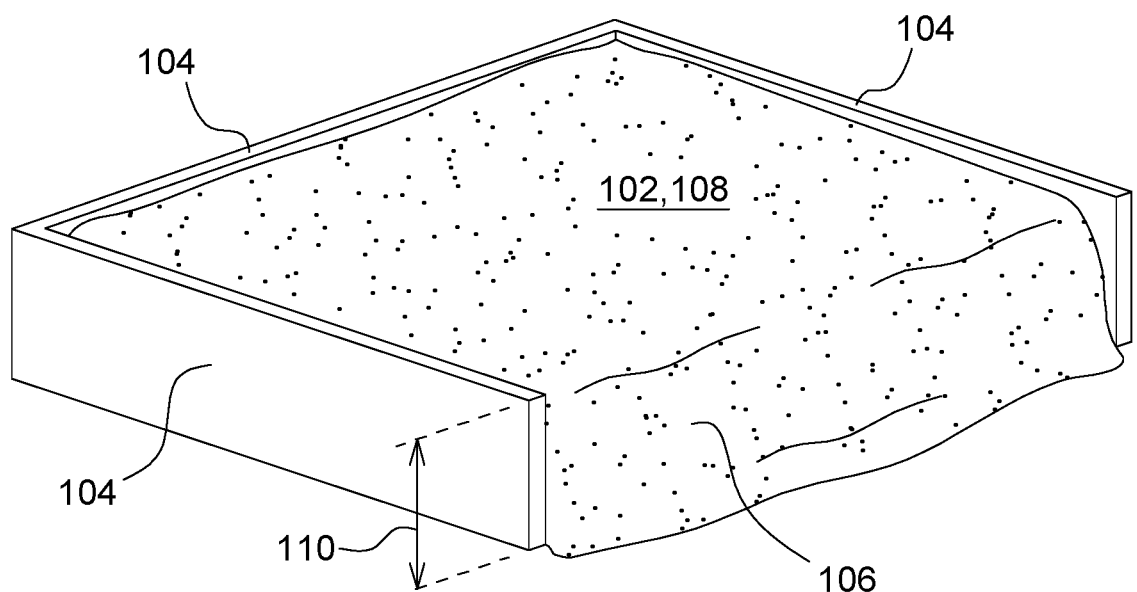
FIG. 1 is a perspective view of an example bunker silo containing bulk silage, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure describes various implementations for forming negative rake angles on silo faces, as described below. Some of the described implementations are electronically controlled, while others are mechanically controlled or actuated. However, as explained above, aspects of the one implementation may be combined with aspects of different implementations.

The present disclosure is directed to systems and methods for removing silage from a silo and, particularly, from bulk silage contained in a bunker silo. Bunker silos containing silage can be massive, and removal of the silage from the bunker silo generally involves the use of machines that remove silage material from a face of the bulk silage material, referred to as a silo face, present within the bunker silo. FIG. 1 is a perspective view of an example bunker silo 100 used to store silage 102. The bunker silo 100 includes sidewalls 104 and an open end 106. The bunker silo 100 defines a volume 108, and the open end 106 provides access to the volume 108 for depositing material, such as vegetation, into the bunker silo 100 and removing the silage 102 from the bunker silo 100.

A volume defined by bunker silos, such as the volume 108 of bunker silo 100, can be massive. For example, referring to FIG. 1, a height 110 of the sidewalls 104 can be tens of feet in height. In some cases, a height 110 may be 45 feet (approximately 14 meters) or greater.

Figure 2:
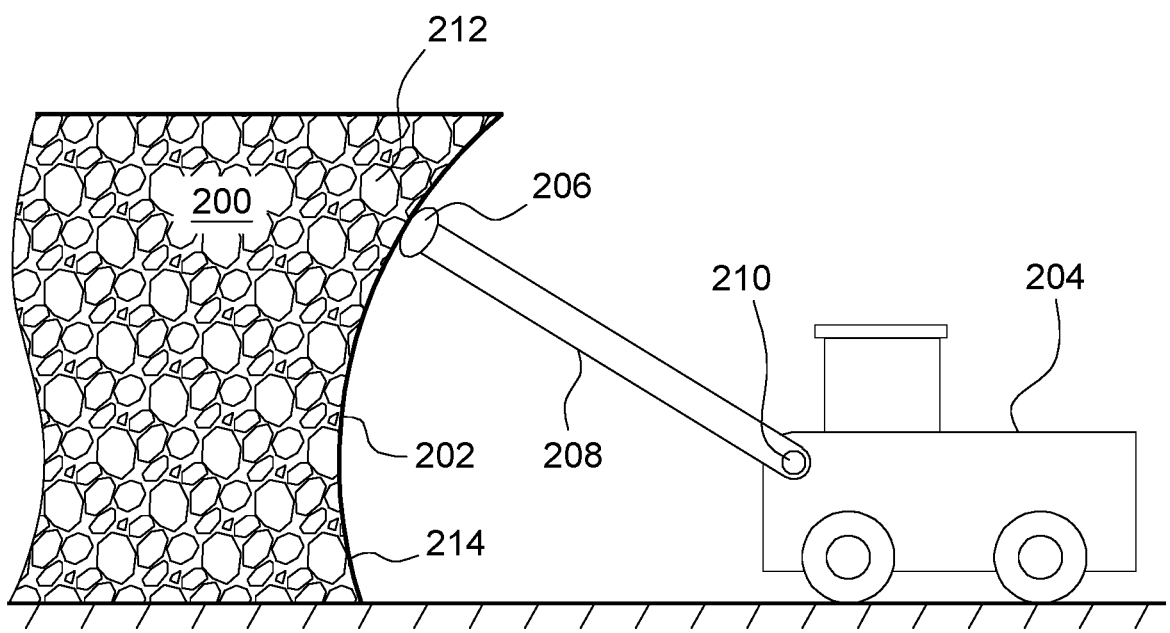
FIG. 2 is an example partial cross-sectional view of silage contained within a bunker silo with a silo face forming an unstable overhang, according to some implementations of the present disclosure.

FIG. 2 is a cross-sectional view of a mass of silage 200 located on a surface 201, such as the ground, that includes a silo face 202. Material is removed from the silage 200 via the silo face 202. The silage 200 may be disposed in a bunker silo, and the silage 200 may be removed via an open end of the bunker silo. In some instances, the silo face 200 may be formed by a machine 204 having a defacer 206. The defacer may be a rotary defacer or a rake-type defacer. As shown in FIG. 2, the defacer 206 is located on a pivotable arm 208 pivotably coupled to the machine 204 that pivots about a horizontal axis 210. The defacer 206 operates to remove silage from the silo face 202. Arcuate movement of the defacer 206 about the horizontal axis 210 causes undercutting to the silage 200 along the silo face 202 and produces an unstable profile (or general shape) of the silo face 202, as shown in FIG. 2. Particularly, an upper portion 212 of the silo face 202 overhangs a base 214 of the silage and is, thus, unsupported vertically. As a result, the upper portion 212 is subject to collapse, which poses a risk to the safety to personnel who may be positioned below the upper portion 212 or otherwise located adjacent to the silo face 202. In other instances, a silo face may be irregular and include outcroppings that also pose risks of collapse.

To avoid the risks of collapse of the silo face, the present disclosure provides systems and methods for forming a stable silo face that inclines towards the silage (referred to hereinafter as negative rake), thereby avoiding overhangs or outcroppings that pose risks of collapse.

Figure 3:
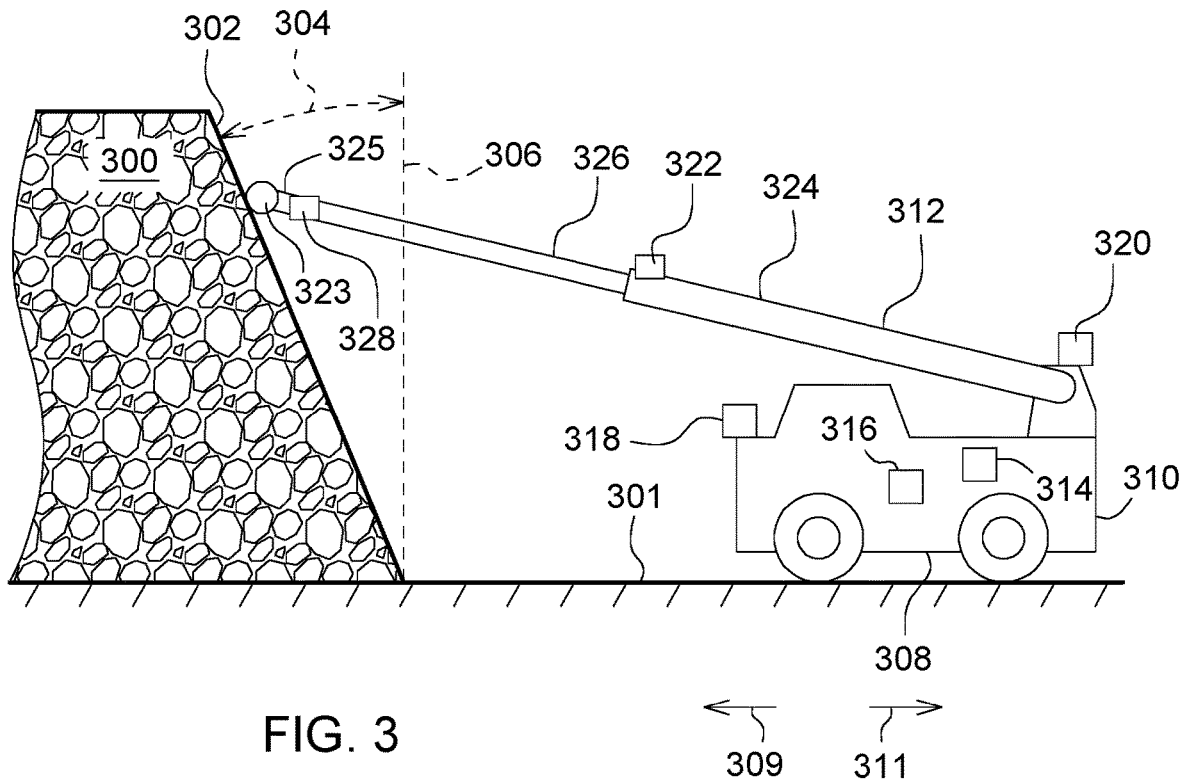
FIG. 3 is another example cross-sectional view of a mass of silage having a silo face with a negative rake angle with a machine operable to form the negative rake angle in the silo face of the silage, according to some implementations of the present disclosure.

FIG. 3 is another example cross-sectional view of a mass of silage 300 disposed on a surface 301, such as the ground. The silage 300 may be disposed in a bunker silo similar to the bunker silo 100 described earlier. The silage 300 includes a silo face 302 from which material is removed from the silage 300 and that forms a negative rake angle 304, as opposed to a positive rake angle in which the silo face 302 forms an overhang, as shown, for example, in FIG. 2. In this example, the rake angle 304 is measured between the silo face 302 and a vertical plane 306 extending along the silo face 302. Although the silo face 302 in the illustrated example defines a planar surface, in other implementations, the silo face 302 may define a curved surface that curves inwards towards the silage 300 and, thus, maintains a negative rake angle that varies along the silo face 302. A silo face with a negative rake angle avoids unstable overhangs and eliminates or reduces a risk of collapse of the silo face. Consequently, the safety risk to personnel and equipment located adjacent to the silo face having a negative rake angle is also reduced.

FIG. 3 also shows a machine 308 being used to remove silage 300 from the silo face 302. The machine 308 may be in the form of a vehicle, such as a telehandler with a silo defacer, a loader, skid steer, a total mixed ration (TMR) feed mixer (e.g., a self-propelled TMR feed mixer), or a tractor and loader combination. Other types of vehicles may also be used.

In the illustrated example, the machine 308 includes a frame 310, an articulating arm 312 pivotably coupled to the frame 310, a drive system 314 operable to move the machine 308 in forward and aft directions 309 and 311, respectively, a controller 316, and sensors 318, 320, and 322. The drive system 314 may be an engine, such as an internal combustion engine or an electric motor, either alone or in combination with a transmission, that is operable to provide power to move the machine 308 along the surface 301. A defacer 323 is coupled at an end 325 of the articulating arm 312.

The sensor 318 is a position sensor that is operable to detect a position of the machine 308 relative to the silo face 302. For example, in some implementations, the sensors 318 may be a radar, lidar, or an ultrasonic sensor. Other types of sensor operable to detect distance may be used. The sensor 320 is an angle or rotary position sensor that is operable to detect an amount by which the articulating arm 312 is rotated relative to the frame 310, and the sensor 322 is a length or linear measurement sensor that senses an amount that the articulating arm 312 has extended. For example, the articulating arm shown in FIG. 3 includes a first portion 324 and a second portion 326 that is telescoping received into the first portion 324. Extension or retraction of the second portion 326 relative to the first portion 324 may be accomplished using, for example, hydraulics (such as a hydraulic system that includes a hydraulic pump and one or more hydraulic actuators); pneumatics; or electric motors. The sensor 322 senses a distance that the second portion 326 is extending from the first portion 324. The controller 316 is operable to determine a position of the defacer 323 (e.g., horizontal and vertical position) relative to the machine 308 and using the information received from sensors 320 and 322 and control the articulating arm 312, e.g., an amount of pivot and extension of the articulating arm 312 to produce a silo face 302 having the negative rake angle 304. Further, the controller 316 is operable to receive position information the sensor 318 and determine where the machine 308 and the defacer 323 is relative to the silo face 302, particularly in combination with the sensed data from sensors 320 and 322. Thus, using data sensed from sensors 320, 322, and 318, the controller 316 is operable to determine a position of the defacer 323 relative to the silo face 302 and position the defacer 323 to engage the silo face 302 to form the negative rake angle 304. Further, a fourth sensor 328 may be included that detects when the defacer 323 contacts and is, thus, engaged with the silo face 302. In some implementations, the sensor 328 may be a load sensor, a torsion sensor, an impact sensor, or some other sensor configured to detect engagement of the defacer 323 with the silo face 302.

As a result, the controller 316 is operable to automatically detect a position of the machine 308 and the defacer 323 relative to the silo face 302, detect when the defacer 323 contacts the silo face 302, and control the articulating arm 312, both in pivoting movement relative to the frame 310 of the machine 308 and in extension of the second portion 326 of the articulating arm 312 from the first portion 324 of the articulating arm 312, to remove material to form the silo face 302 to define the negative rake angle 304. Particularly, in some implementations, with the machine 308 positioned at a desired location relative to the silo face 302 and the defacer 323 in contact with the silo face 302, the controller 316 may simultaneously extend and pivot upward the articulating arm 312 in order to form negative rake angle 304 in the silo face 302. Upon completion of this operation, such as when the articulating arm 312 has been fully extended or extended a desired amount, the articulating arm 312 may be retracted while the articulating arm 312 is simultaneously pivoted downwards towards the surface 301 to continue removing material from the silo face 302 while also maintaining the negative rake angle 304. These operations may be performed in a cyclical manner to remove material from the silo face 302 in a continuous manner. Thus, in some implementations, the controller 316 may use the articulating arm 312, both in rotation and extension and retraction, to the exclusion of the drive system 314, to form the negative rake angle 304 in the silo face 302.

In some implementations, once contact between the defacer 323 and the silo face 302 is detected, the defacer 323 may be further pressed into the silo face 302. This additional displacement of the defacer 323 towards and into the silo face 302 may correspond to a selected amount of movement of the defacer 323 beyond a position at which contact between the defacer 323 and the silo face 302 is detected or a selected pressing force applied by the defacer 323 to the silo face 302 as the defacer 323 is displaced into the silo face 302. This increased engagement between the defacer 323 and the silo face 302 may ensure engagement so that material is removed from the silo face 323 along the entire movement of the defacer 323 along the silo face 302, whether movement is upwards along the silo face 302 or downwards along the silo face 302. Thus, this increased engagement may avoid loss of contact between the defacer 323 and the silo face 302 during all or part of the travel of the defacer 323 along the silo face 302. Further, this additional displacement, measured by distance or load, for example, may be maintained throughout removal of material from the silo face 302 by the defacer 323.

In other implementations, the controller 316 may use the drive system 314 in combination with rotation and extension and retraction of the articulating arm 312 to form the silo face 302 with the negative rake angle 304. Consequently, the controller 316 may operate the drive system 314 to advance the machine 308 towards the silo face 302 in the direction 309 while, in combination, extending and pivoting the articulating arm 312 upwards to form the slope associated with the negative rake angle 304 in the silo face 302. Once the vehicle has advanced to a selected position relative to the silo face 302, the controller 316 may cease operation of the drive system 314 to stop advancement of the machine 308. In some implementations, the articulating arm 312 may still have capacity to further extend the articulating arm 312, pivot the articulating arm 312, or both. Thus, the articulating arm 312 may be further extended or pivoted upwards or both to form the negative rake angle 304 in the silo face 302 after advancement of the machine 308 has ceased. Similarly, the controller 316 may operate the articulating arm 312 to pivot the articulating arm 312 downwards towards the surface 301, retract the articulating arm 312, or both until a selected amount of rotation, retraction, or both is reached, at which point, the controller 316 may operate the drive system 314 to move the machine 308 away from the silo face 302 in the direction of 311.

Thus, in some implementations, the controller 316 may utilized the articulating arm 312 in both pivot and extension and retraction in combination with the drive system 314 to remove material from the silo face 302 and form the negative rake angle 304. In other implementations, the controller 316 may use the articulating arm 312, to the exclusion of the drive system 314, to form the negative rake angle 304 in the silo face 302.

Figure 4:
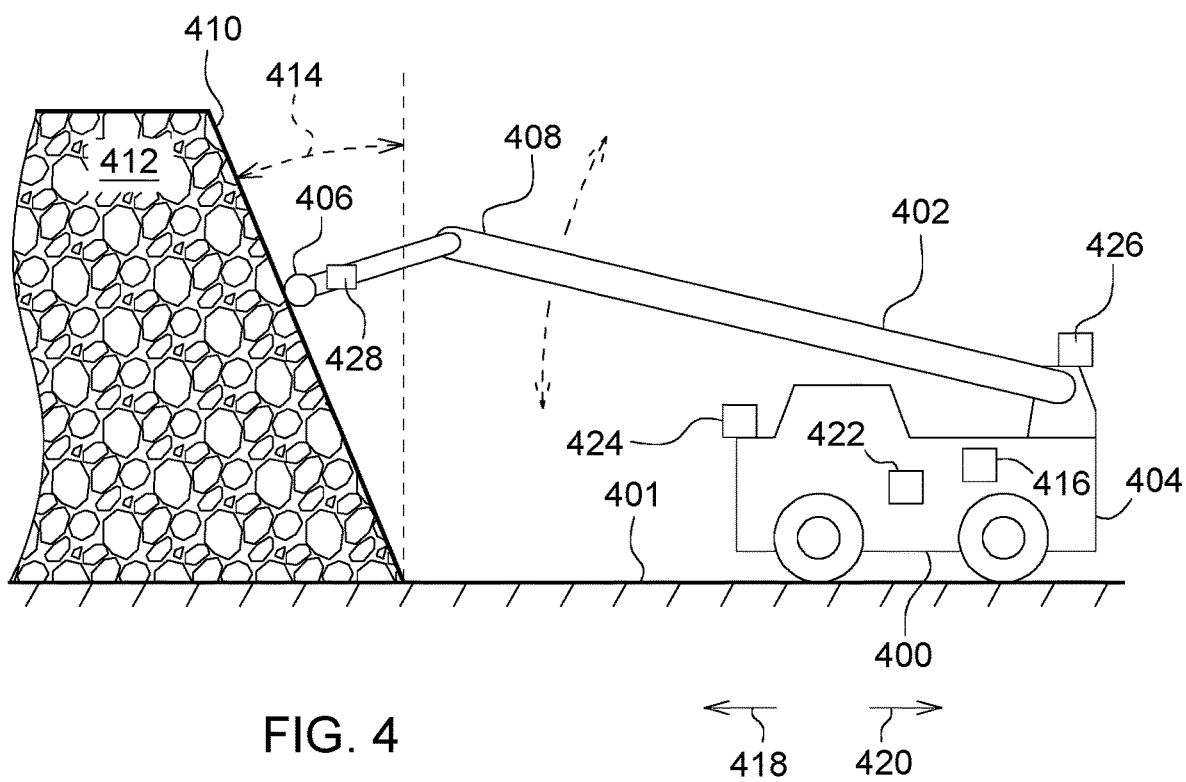
FIG. 4 another example cross-sectional view of a mass of silage having a silo face with a negative rake angle and a machine operable to form the negative rake angle in the silo face, according to some implementations of the present disclosure.

FIG. 4 shows another example vehicle 400 located on a surface 401, such as the ground, that includes an articulating arm 402 that is pivotably coupled to a frame 404 of the vehicle 400 but has a fixed length. That is, the articulating arm 420 is unable to extend or retract. Alternatively, the following description is applicable to articulating arms that have the capability to extend and retract, but that functionality is not used.

A defacer 406 is coupled to an end 408 of the articulating arm 402. The defacer 406 is operable to engage with a silo face 410 of a mass of silage 412, and the silo face 410 defines a negative rake angle 414. The vehicle 400 also includes a drive system 416 that is operable to move the vehicle 400 forward 418 and aft 420 in order to move the vehicle 400 towards and away from the silo face 410, respectively. The vehicle 400 also includes a controller 422 and sensors 424, 426, and 428 that transmit sensed information to the controller 422. The sensor 424 may be similar to the sensor 318, described earlier, and is operable to detect a position of the vehicle 400 relative to the silo face 410 of the silage 412. The sensor 426 may be similar to the sensor 320, described earlier, and is operable to detect an amount of rotation of articulating arm 402 relative to the frame 404, and the sensor 428 may be similar to the sensor 328 and is operable to detect engagement, i.e., contact, between the defacer 406 and the silo face 410.

The controller 422 receives position information from sensor 424 to determine a position of the vehicle 400 relative to the silo face 410. The controller also receives information from the sensor 426 regarding an amount by which the articulating arm 402 is rotated relative to the frame 404 of the vehicle 400. In some implementations, the controller 422 also receives sensor information from sensor 428 to detect when the defacer 406 contacts the silo face 410.

In operation, the controller 422 operates the drive system 416 to advance the vehicle 400 towards the silage 412. The controller 422 ceases operation of the drive system 416 when contact is detected between the defacer 406 and the silo face 410 using the sensor 428. With the defacer 406 in contact with the silo face 410, the controller simultaneously operates the drive system 416 and pivoting of the articulating arm 402, e.g., by operating a power system used to pivot the articulating arm 402 such as a hydraulic power system (e.g., a hydraulic system including a hydraulic pump and hydraulic actuator such as a hydraulic cylinder), to remove material from the silage 412 and maintain the negative rake angle 414. Particularly, the controller 422 operates the drive system 416 to advance the vehicle 400 towards the silage 412 in the direction 418 while simultaneously pivoting the articulating arm 402 upwards to define the negative rake angle 414. The amount of pivoting of the articulating arm 402 relative to advancement of the vehicle 400 may vary depending on the magnitude of the negative rake angle 414.

Further, the controller 422 is also operable to control movement of the articulating arm 402 by lowering the articulating arm 402 to form the negative rake angle 414 as the vehicle 400 is moved away from the silo face 410 in the direction 420.

Thus, the controller 422 controls the amount of pivoting of the articulating arm 402 and the amount of advancement or withdrawal of the vehicle 400 relative to the silo face 410 in order to generate a negative rake angle 414 of a selected value.

Figure 5:
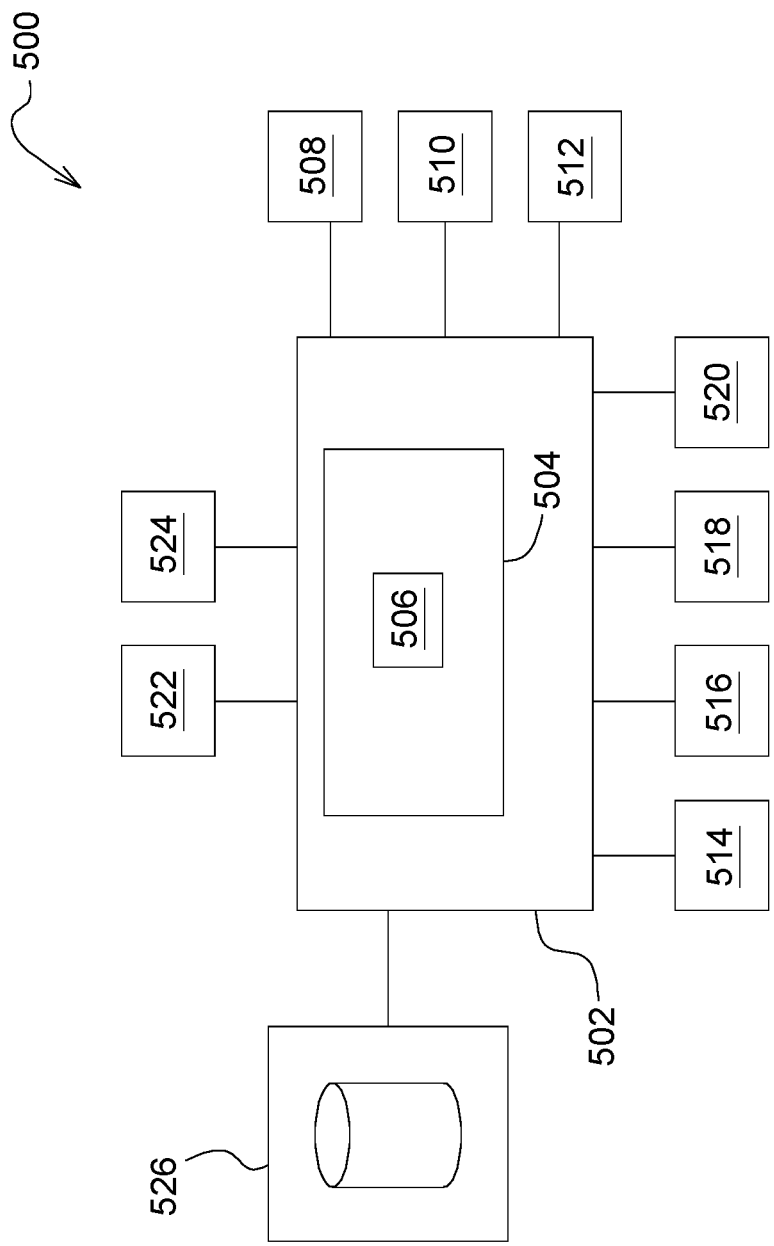
FIG. 5 is a schematic of an example system for automatically forming a negative rake in a silo face in bulk silage, according to some implementations of the present disclosure.

FIG. 5 is a schematic of an example system 500 that is operable to automatically control formation of a negative rake angle in a silo face of a volume of silage, such as bulk silage contained in a bunker silo, as described earlier. The system 500 may be entirely or partially included in a machine, such as a vehicle, used to remove material from the bulk silage. The machine may be, for example, telehandler, a loader, skid steer, a TMR feed mixer, or a tractor. The system 500 may be in the form of a computer system, as described in more detail below, and includes a controller 502. The controller 502 includes one or more processors 504. An application 506 is executed by the one or more processors 504 to control an articulating arm 508 and, optionally, a drive system 510 of a vehicle to automatically control formation of the negative rake angle in the silo face. The system also includes a defacer 512 coupled to an end of the articulating arm 508 and sensors, such as a position sensor 514, a contact sensor 516, a rotation sensor 518, and a length sensor 520, that are used by the controller 500 to control operation of the defacer 512 (e.g., a position of the defacer 512) when forming the negative rake angle. For a dynamic defacer, such as a rotary defacer, the controller 502 may be operable to start and stop operation of the dynamic defacer.

The position sensor 514 may be of a type described earlier or otherwise within the scope of the present disclosure and is used to detect a position of the machine and, hence, the defacer, relative to the silo face. The contact sensor 516 may be of a type described earlier or otherwise within the scope of the present disclosure and is operable to detect contact between the defacer 512 and the silo face of the bulk silage. The rotation sensor 518 may be of a type described earlier or otherwise within the scope of the present disclosure and senses an amount of rotation of the articulating arm relative to, for example, another portion of the vehicle (e.g., a frame of the vehicle); and a length sensor 520 may be of a type described earlier or otherwise within the scope of the present disclosure and detects an amount of extension of the articulating arm 508.

The system 500 also includes an input device 522, a display 524, and a storage device 526. The input device 522 is operable to permit user input into the system 500 and may be any type of input device, such as those input devices described in more detail below. The display 516 operates to display information to the user from the system 500. In some implementations, the display 516 may be a touch screen and, therefore, also function as an input device. The storage device 516 store programs and data used by the controller 502. Although the storage device 516 is shown remotely coupled to the controller 502, in other implementations, the controller 502 may be incorporated into the controller 502.

With the machine disposed adjacent to a silo face of bulk silage, the controller 502, using rotary position information and length information provided by the rotation sensor 518 and the length sensor 520, controls both rotation and extension of the articulating arm 508 to form a negative rake angle into the silo face of the bulk silage using the defacer 512. For example, in some implementations, with the defacer 512 in contact with the silo face, the controller 502 commands a power system, such as a hydraulic system or electrical power system, to pivot the articulating arm 508 upwards while extending the articulating arm 508 to form the negative rake angle. Similarly, using the sensor information provided by the rotation sensor 518 and the length sensor 520, the controller 502 may retract the articulating arm 508 while rotating the articulating arm 508 downwards to form the negative rake angle. A desired negative rake angle to be formed by the defacer 512 in response to the automated control of the controller 502 may be entered by a user using the input device 522 or display 524, where the display includes input functionality, such as touch screen functionally. Extension and rotation of the articulating arm 508 is automatically controlled by the controller 502 to define a negative rake angle having a designated slope, such as a slope inputted by a user.

In other implementations in which the controller 502 utilizes sensor data from the contact sensor 516, the controller 502 may extend the articulating beam 508 until contact between the silo face and the defacer 512 is detected by the contact sensor 516. With contact detected, extension of the articulating arm 508 may be ceased, and simultaneous rotation and extension or retraction of the articulating arm 508 may be performed as described earlier in order to form the negative rake angle in the silo face.

In still other implementations, the controller 502 may also utilize the sensor information from the position sensor 514. Using the sensed position information, the controller 502 may operate the drive system 510 to move the vehicle towards the silo face of the bulk silage. When contact between the silo face and the defacer 512 is detected using sensor data from the contact sensor 516, the controller 502 commands the drive system 510 to stop movement of the vehicle towards the silo face. With the vehicle in position relative to the silo face, the controller 502 operates the articulating arm 508 as described earlier, both in length and rotation, to form the negative rake angle. In other implementations, the controller 502 may operate simultaneously to alter a length and rotation of the articulating arm 508 while simultaneously changing a position of the vehicle relative to the silo face to form the negative rake angle, as described earlier. Still further, the controller 502 may continue to operate the drive system 510 while simultaneously pivoting and extending or retracting the articulating arm 508 to form the negative rake angle. Thus, the rates of movement of the articulating arm 508 in both rotation and extension (or retraction) and a rate of movement of the machine via operation of the power system 510 are automatically controlled by the controller 502 to define the negative rake angle with a designated slope.

In other implementations, the articulating arm 508 may lack length-change functionality. That is, in some instance, the articulating arm 508 may have a fixed length. In such cases, the controller 502 may use sensor information from the rotation sensor 518 and position sensor 514 to control formation of the negative rake angle in the silo face. As explained earlier, the controller 502 may operate the drive system 510 using the position information from the position sensor 514 to advance the vehicle towards the silo face while simultaneously controlling rotation of the articulating arm 508 (i.e., pivoting the articulating arm 508 upwards) using the sensed rotation information from the rotation sensor 518 to form the negative rake angle. Similarly, the controller 508 may operate the drive system 510 using sensed information from the position sensor 514 to move the vehicle away from the silo face while simultaneously pivoting the articulating arm 508 downwards using sensed rotation information from the rotation sensor 518 to form the silo face. The controller 502 controls the rates of rotation of the articulating arm 508 and the rate of movement of the machine towards and away from the silo face to define a slope of the negative rake angle. The controller 502 may also use sensed information from the contact sensor 516 to initially detect contact between the defacer 512 and the silo face or at one or more times during formation of the negative rake angle to verify or determine contact between the defacer 512 and the silo face.

Figure 6:
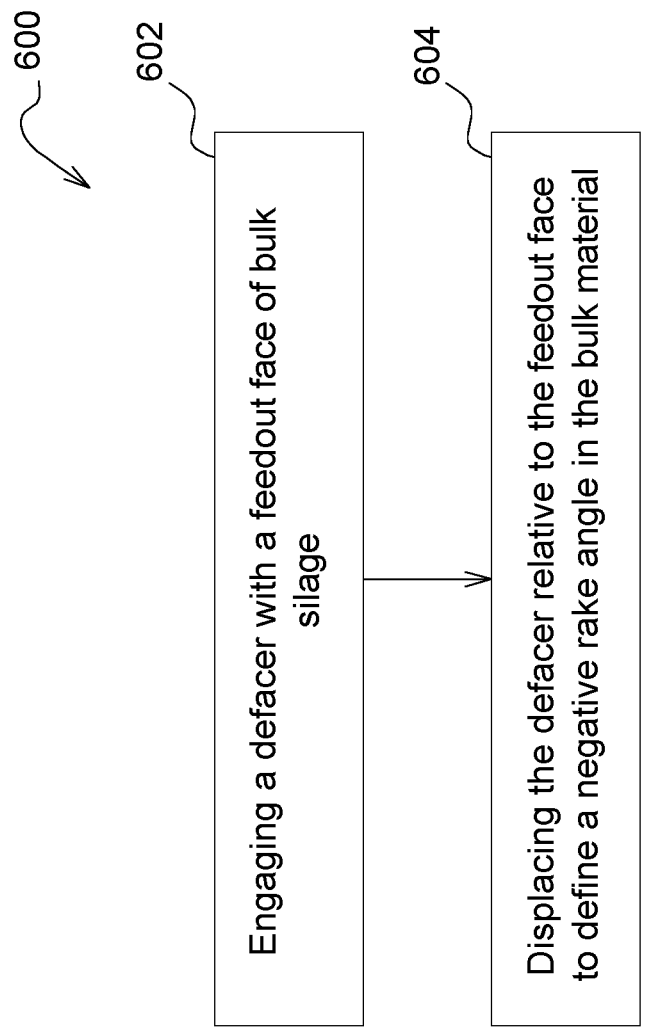
FIG. 6 is a flowchart of an example method for forming a negative rake angle in a silo face of bulk silage, according to some implementations of the present disclosure.

FIG. 6 is a flowchart of an example method 600 for automatically forming a negative rake angle in a silo face of bulk silage or other bulk material. Automatically forming the negative rake angle in the silo face is performed using a controller, such as the controller 502 or other controller within the scope of the present disclosure. At 602, a defacer is engaged with a silo face of bulk silage material, such as bulk silage material contained in a bunker silo. The defacer may be, for example, a rotary defacer or a rake-type defacer. In some implementations, engaging the defacer with the silo face may include detecting contact between the defacer and the silo face using a contact sensor. Engaging the defacer with the silo face may also include extending an articulating arm to cause the defacer to move towards to the silo face or advance a machine having the articulating arm toward the silo face or both extending the articulating arm and advancing the machine towards the silo face until the defacer contacts the silo face. The controller may operate a power system, such as a hydraulic system, to extend the articulating arm, and the controller may operate a drive system of the machine, such as an engine or electric motor, to advance the machine toward the silo face, or a combination of the two.

At 604, the defacer is displaced relative to the silo face to define a negative rake angle in the bulk material. Displacing the defacer relative to the silo face may include one or more of the following: pivoting an articulating arm; altering a length the articulating arm; and altering a position of the machine relative to the silo face. For example, a negative rake angle in the silo face may be formed by controlling a power system, such as a hydraulic system, to simultaneously pivot the articulating arm towards a vertical position from a horizontal position at a first selected rate while simultaneously extending the articulating arm at a second selected rate to form a negative rake angle with a selected slope. Controlled simultaneous retraction of the articulating arm and pivoting the articulating arm downwards towards a horizontal position at respective rates of movement may also be used. Still further, movement of the machine towards or away from the silo face at a selected rate may be incorporated, either with or without altering a length of the articulating arm, to form the negative rake angle having a desired slope. For example, a controller may simultaneously control advancement of the machine towards the silo face, extend the articulating arm, and raise (e.g., pivoting upwards) the articulating arm, with each motion being performed at a defined rate, to form the negative rake angle with a designated slope. The controller may simultaneously withdraw the vehicle away from the silo face; retract the articulating arm, and lower (e.g., pivoting downwards) the articulating arm to form the negative rake angle. further, these different approaches may be used cyclically to move the defacer back and forth across the silo face to remove material therefrom and form a negative rake angle thereon. A controller may receive a designated slope for the negative rate angle and selectively operate the different operations (e.g., extension and retraction of an articulating arm; rotation of the articulating arm; movement of the machine towards and away from a silo face) at selected rates to form the designated slope. The selected rates of operation may be determined by the controller based on the designated slope while also using geometry and operations capabilities of the machine.

Further, where an articulating arm does not have length altering functionality or where altering a length of the articulating arm is not desired, a controller may simultaneously advance the machine towards the silo face while raising the articulating arm or simultaneously withdraw the machine away from the silo face while simultaneously lowering the articulating arm to remove material from the silo face while simultaneously forming a negative rake angle therein. Again, these different approaches may be used cyclically to move back and forth across the silo face to remove material therefrom and form a negative rake angle thereon. Further the rates of movement may be controlled to define a negative rake angle with a desired slope. The material removed from the silo face may be collected. For example, the removed material may be collected by the machine. For example, the vehicle may be a TMR feed mixer that collects the removed material directly from the silo face.

In still other implementations, the machine may simultaneously move laterally across the silo face while forming the negative rake angle, and this movement, too, may also be controlled by a controller, such as controller 502, at a selected rate.

Figure 7:
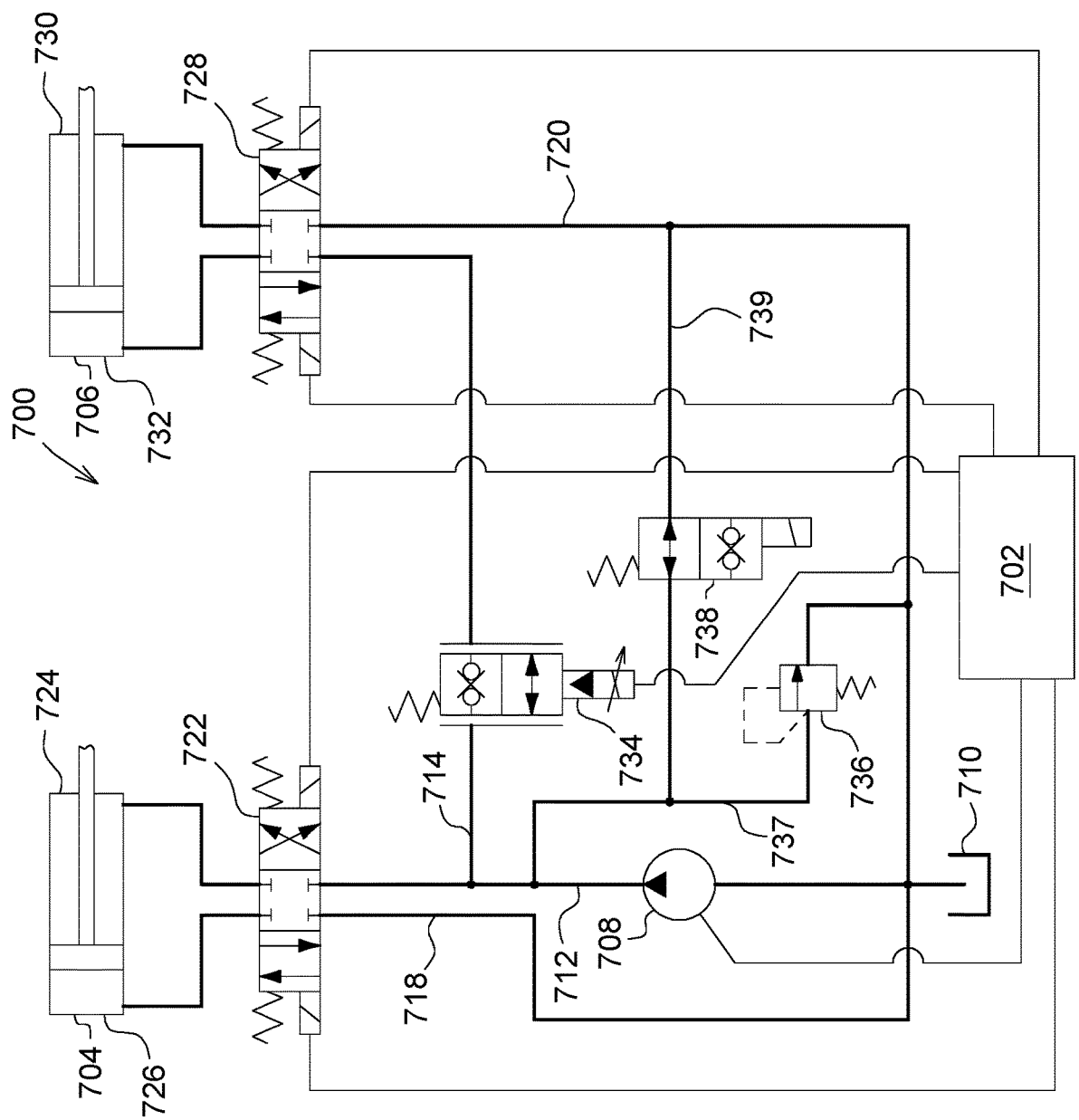
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a schematic of an example hydraulic system 700 that is operable both to alter a length and an amount of rotation of an articulating arm. A controller 702, which may be similar to controller 502, is communicably coupled to the hydraulic system 700 and is operable to alter both a length and an amount of rotation of the articulating arm in a simultaneous manner to define a slope of a silo face of bulk silage such as to define a desired negative rake angle.

The example hydraulic system 700 includes a first hydraulic cylinder 704 and a second hydraulic cylinder 706. The first hydraulic cylinder 704 operates to extend or retract an articulating arm to alter a length of the articulating arm. The second hydraulic cylinder 706 operates to pivot the articulating arm. A pump 708 pumps hydraulic fluid from a reservoir 710 through a feed line 712. The pump 708 may be a constant displacement pump. The hydraulic fluid is distributed to the first hydraulic cylinder 704 from the feed line 712 and to the second hydraulic cylinder 706 via a feed line 714 that branches off from the feed line 712. Hydraulic fluid is returned from the first and second hydraulic cylinders 704 and 706 via return lines 718 and 720, respectively.

A first three-position solenoid-operated valve 722 is in fluid communication with the feed line 712 and the return line 718. The first valve 722 includes a default closed position, a first open position, and a second open position. In the default position, the valve 722 prevents passage of hydraulic fluid to or from the first hydraulic cylinder 704. In the first open position, the first valve 722 permits flow of hydraulic fluid from the feed line 712 to a first or rod end 724 of the first hydraulic cylinder 704 while hydraulic fluid in a second or piston end 726 is permitted to pass through the first valve 722 to drain back to the reservoir 710 via the return line 718. In the second open position, hydraulic fluid from the feed line 712 is directed through the first valve 722 to the second end 726 of the first hydraulic cylinder 704, and hydraulic fluid in the first end 724 is directed through the first valve 722 to the return line 718 and to the reservoir 710.

The first hydraulic cylinder 704 may be used to raise and lower an articulating arm. With first valve 722 in the first open position, the first hydraulic cylinder 704 is retracted, and the articulating arm is lowered or pivoted downward. With the first valve 704 in the second open position, the first hydraulic cylinder 704 extends, causing the articulating arm to raise or rotate upward. With the first valve 722 in the default position, the first hydraulic cylinder 704 is placed in a fixed configuration in which the articulating arm is locked into a position.

The system 700 also includes a second three-position solenoid-operated valve 728, similar to the first valve 722. The second valve 728 operates similarly to the first valve 722 and includes a default closed position, a first open position, and a second open position. Similar to the first hydraulic cylinder 704, the second hydraulic cylinder 706 includes a first or rod end 730 and a second or piston end 732.

In the default position, fluid is prevented from passing through the second valve 728. In the first open position, hydraulic fluid from feed line 714 passes to the second end 732 of the second hydraulic cylinder 706, and hydraulic fluid in the first end 730 is permitted to pass into the return line 720 and to the reservoir 710. In the second open position, the second valve 706 permits passage of hydraulic fluid from the feed line 714 to the first end 730 and passage of hydraulic fluid in the second end 732 to return to the reservoir 710 via the return line 720. In this way, the second valve 728 is operable to extend or retract an articulating arm to alter a length of the articulating arm.

A solenoid-operated proportional valve 734 is disposed in the feed line 714 and provides for variable fluid flow therethrough. The proportional valve 734 has a default closed position and is movable to provide variable flow through the valve, for example, based on a magnitude of an applied voltage. For example, as the voltage increases, an opening formed in the proportional valve 734 increases, permitting increased flow therethrough.

The hydraulic system 700 also includes a pressure-relief valve 736 and a solenoid-operated free-flow valve 738. The free-flow valve 738 is opened, such as by the controller 702, to allow hydraulic fluid from the pump 708 to flow back to the reservoir 710 via line 739. The free-flow valve 738 may be opened by the controller 702 when rotation or extension or retraction of the articulating arm is not occurring and the pump is a constant displacement pump to permit the pumped fluid to return to the reservoir 710, thereby providing for circulation of the hydraulic fluid. When rotation, extension, or retraction of the articulating arm is commanded by the controller 702, the controller 702 also commands the free-flow valve 738 to close. The controller 702 is operable to control the free-flow valve 738. The pressure-relief valve 736 opens to return fluid to the reservoir 710 via line 737 if a pressure exceeds a selected pressure.

The controller 702 is operable to control rotation and extension and retraction of an articulating arm to form a negative rake angle having a selected slope. The controller 702 sends signals, such as in the form of voltage or current, to the first valve 722, the second valve 728. and the proportional valve 734. For example, the controller 702 may move the first valve 722 into the second open position to raise an articulating arm and position the second valve 728 in the first open position to permit extension of the articulating arm. Simultaneously, the controller 702 operates the proportional valve 734 to permit raising and extension of the articulating arm at the same time. The amount by which the proportional valve 734 is opened alters the rate at which extension of the articulating arm occurs, thereby altering a proportion of raising of the articulating arm compared to extension of the articulating arm.

The controller 702 may move the first valve 722 into the first open position while moving the second valve 728 into the second open position. Simultaneously, the controller 702 may position the proportional valve 734 to have a selected opening size. As a result, the controller 702 is operable to lower the articulating arm while simultaneously retracting the articulating arm at a selected ratio of each type of movement based on the position of the proportional valve 734. The controller 702 selects the position of the proportional valve 734 based on a selected slope of the negative rake angle to be formed. Further, the controller 702 may also alter a speed of the pump 708 to alter a rate at which first hydraulic cylinder 704 operates and, when the proportional valve 734 is at least partially open, a rate at which the second hydraulic valve 706 operates.

Figure 8:
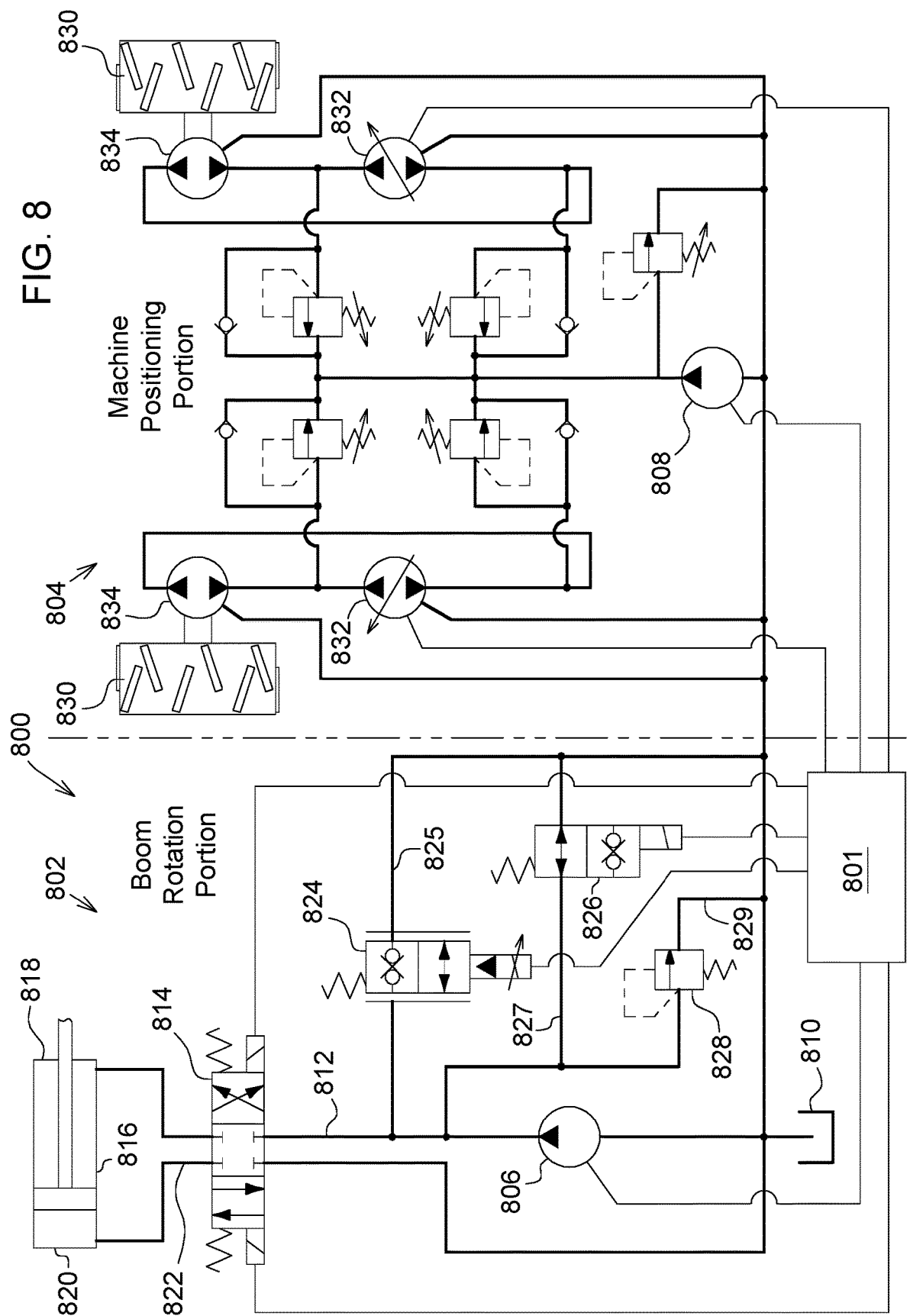
FIG. 8 is a schematic of another example hydraulic system that may be used for a machine having an articulating arm that is not extendable, according to some implementations of the present disclosure.

FIG. 8 is a schematic of another example hydraulic system 800 that may be used for a machine having an articulating arm that is not extendable, i.e., the articulating arm has a fixed length. The system includes an articulating arm rotation portion 802 and a machine positioning portion 804. Each of the portions 802 and 804 includes respective pumps 806 and 808 that draw hydraulic fluid from a common reservoir 810. In some implementations, one or both of the pumps 806 and 808 may be a charge pump. The system 800 includes a controller 801 that functions to automatically control rotational operation of the arm and movement of the machine relative to a silo face to form a negative rake angle having a selected slope. As described below, the controller 801 controls operation of both the arm rotation portion 802 and the machine positioning portion 804.

The arm rotation portion 802 includes a feed line 812 that directs hydraulic fluid to a first three-position solenoid-operated valve 814 that controls the delivery and evacuation of hydraulic fluid to and from a first hydraulic cylinder 816. The first valve 814 includes a default closed position, a first open position, and a second open position. In the default closed position, the first valve 814 prevents passage of hydraulic fluid. In the first open position, the first valve 814 permits passage of hydraulic fluid from the feed line 812 into a first or rod end 818 of the first hydraulic cylinder 816 and permits passage of fluid from a second or piston end 820 of the first hydraulic cylinder 816 to a return line 822 that ultimately returns hydraulic fluid to the reservoir 810. In the second open position, the first valve 814 directs pumped hydraulic fluid to second end 820 of the hydraulic cylinder 816 and directs hydraulic fluid in the first end 818 of the hydraulic cylinder 816 into the return line 822, which directs the hydraulic fluid to the reservoir 810.

The arm rotation portion 802 also includes a proportional valve 824, a free-flow valve 826, and a pressure relief valve 828 disposed in a first line 825, a second line 827, and a third line 829, respectively, each in fluid communication with the feed line 812. The free-flow valve 826 operates similarly to the free-flow valve 738 described earlier. For example, where the pump 806 is a constant displacement pump and rotation of the arm is not selected, the free-flow valve 806 is opened to permit circulation of the pumped hydraulic fluid back to the reservoir 810. Thus, when the controller 810 is not commanding extension or retraction of the first hydraulic cylinder 816 to produce rotation of the articulating beam, the free-flow valve 806 is opened to permit circulation of hydraulic fluid produced by the pump 806, where pump 806 is a constant displacement pump.

The controller 801 controls the rate at which the hydraulic cylinder 816 actuates by controlling an amount by which the proportional valve 824 is opened. The proportional valve 824 may be similar to the proportional valve 734. By varying an opening sized formed in the proportional valve 824, an amount of fluid permitted to pass through the proportional valve 824 varies which also varies a pressure of the pumped fluid passing through the feed line 812. This change in the pressure of the pumped hydraulic fluid affects the rate at which the hydraulic cylinder 816 actuates. Consequently, as the amount by which the proportional valve 824 is opened increases, the rate at which the hydraulic cylinder 816 actuates decreases. Therefore, the controller 801 controls an amount by which the proportional valve 824 opens to control the rate at which the hydraulic cylinder 816 actuates, and, thus, the rate at which the articulating arm coupled to the hydraulic cylinder 816 is pivoted. Hydraulic fluid that passes through the proportional valve 824 is returned to the reservoir 810.

The machine positioning portion 804 forms a hydraulic drive system used to move and turn the machine. For example, the machine positioning portion 804 provides for differential rotation (i.e., rotation at different speeds or directions) of traction components 830 (e.g., wheels, tracks, or other components operable to move a vehicle along a surface). Differential rotation of the traction components 830 is used to turn the vehicle, which includes having one of the traction control components 830 move at a rate different than that of the other traction control component 830 or in a direction that is opposite to a direction of the other traction control component 830.

The machine positioning portion 804 also includes variable displacement drive pumps 832 and fixed displacement drive motors 834. One of the variable displacement drive pumps 832 and one of the fixed displacement drive motors 834 are paired to function with each of the traction components 830. The pump 808 maintains a charged hydraulic circuit. That is, the pump 808 provides an amount of hydraulic fluid to the hydraulic circuit that enables operation of the pumps 832. The pumps 832 are variable displacement drive pumps and are operable to vary an amount of hydraulic fluid pumped to the drive motors 834 as well as a direction in which fluid flow is provided to the drive motors 834. The controller 801 is operable to individually change both a fluid flow rate and fluid flow direction provided by the variable displacement drive pumps 832 to the respective drive motors 834. Consequently, the controller 801 is operable to control independently both a rate of movement, e.g., rotation, of each traction component 830 as well as a direction of movement of each traction component 830.

The controller 801 may include different modes, such as a conventional steering mode and a silo defacing mode. In the conventional steering mode, the machine positioning portion 804 is operable to provide a differential steering capability in which the traction components 830 may be operated at different rotational speeds and directions relative to each other. In silo defacing mode, the controller 801 operates the pumps 808 and 832 provide synchronous movement, for example, in both rotational speed and direction, of the traction components 830. Particularly, the controller 801 coordinates operation of the machine positioning portion 804, for example, to advance and withdraw the machine towards and away from a silo face, respectively, with the arm rotation portion 802, for example to raise or lower an articulated arm, to define a negative rake angle in the silo face having a selected rake angle.

As shown in FIG. 8, the controller is communicably coupled to the first and second pumps 806 and 808, the first valve 814, the proportional valve 824, the free-flow valve 826, and the variable displacement drive pump 832 to control operation respectively thereof. In operation, the controller 801 contains or receives through an input device, such as input device similar to input device 522, a slope to be formed in a silo face of bulk silage by a machine. The controller 801 provides signals to first valve 814 to control extension and retraction of the hydraulic cylinder 816 and, thus, raising and lowering of an articulating arm coupled to the hydraulic cylinder 816. The controller 801 also controls an amount by which the proportional valve 824 is opened in order control a rate at which the hydraulic cylinder 816 actuates and, thus, a rate at which the articulating arm is raised or lowered. Simultaneously, the controller 801 controls operation of the variable displacement drive pumps 832 to control a speed and direction of movement of the traction components 830 and, thus, movement, e.g., movement towards or away from a silo face, of the machine as well as a rate of movement of the traction components 830 and, therefore, the machine.

In some implementations, with the controller 801 in the silo defacing mode, a rate at which the hydraulic cylinder 816 is controlled via operation of the proportional valve 824. Thus, for a given rate of rotation of the traction components 830, the rate at which the hydraulic cylinder 816 is actuated and, thus, a rate at which the articulating arm is raised or lowered, is altered by adjusting an amount by which the proportional valve 824 is opened. As explained above, varying this amount of actuation of the hydraulic cylinder 816 may be used to adjust a rake angle formed in a silo face.

The controller 801 is, therefore, operable to control a rate of movement of the machine towards a silo face while simultaneously controlling a rate at which the articulating arm is raised to form a negative rake angle having a selected slope in the silo face of bulk silage. Similarly, the controller 801 is operable to control a rate at which the machine is withdrawn from the silo face while also controlling a rate at which the articulating arm is lowered to also form the negative rake angle having the selected slope in the silo face. Thus, the controller 801 is operable to control the rate of movement of a machine relative to a silo face while simultaneously controlling a rate at which an articulated arm is raised or lowered. The controller 801 can perform these operates in a cyclical manner to continuously remove material from the bulk silage while maintaining the negative rake angle having the selected slope in the silo face of the bulk silage.

Figure 9:
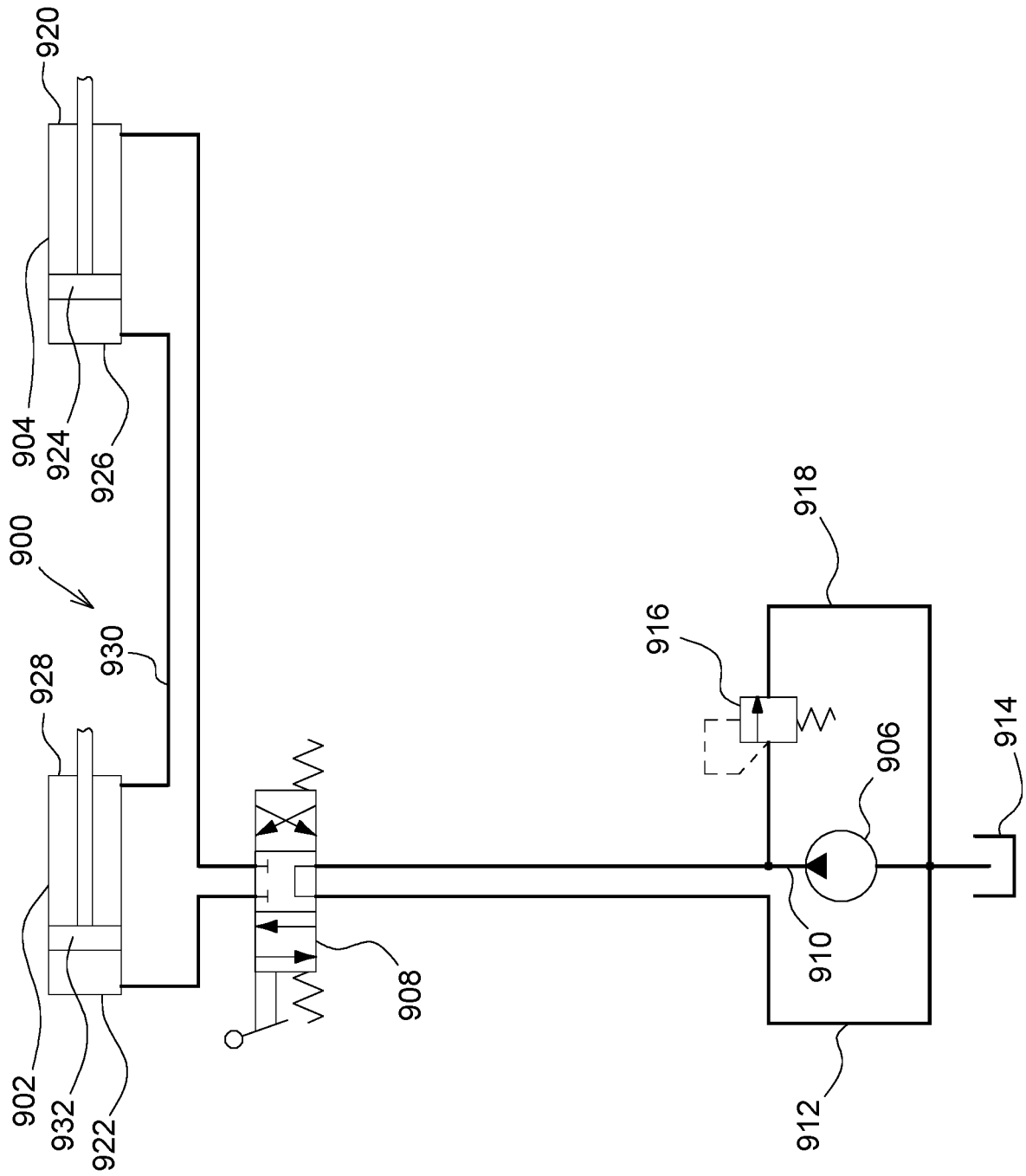
FIG. 9 is a schematic diagram of another example system that may be used to operate an articulating arm to form a negative rake angle in a silo face of bulk silage, according to some implementations of the present disclosure.

FIG. 9 is a schematic diagram of another example system 900 for forming a negative rake angle in a silo face of bulk silage. The system 900 may be applied to a vehicle or other device having an articulating arm that is both rotatable about a pivot and extendable to increase or decrease a length of the articulating arm. The system 900 includes a first hydraulic cylinder 902 and a second hydraulic cylinder 904. The first hydraulic cylinder 902 may be configured to raise or lower the articulating arm by pivoting the articulating arm about a pivot axis. The second hydraulic cylinder 904 may be configured to extend and retract the articulating arm to alter a length of the articulating arm.

The system 900 also includes a pump 906 that pumps pressurized hydraulic fluid to a three-position mechanically operated valve 908 via a feed line 910 and a return line 912 through which hydraulic fluid is returned to a reservoir 914. The valve 908 may be a mechanical hydraulic valve that is actuated mechanically, such as by a lever, into the different positions of the valve. In other implementations, the valve 908 may be an electrically operated valve. For example, in some implementations, the valve 908 may be a solenoid-operated valve. The pump 906 draws hydraulic fluid from the reservoir 914. The system 900 also includes a pressure-relief valve 916. The pressure-relief valve 916 opens to return hydraulic fluid to the reservoir 914 via return line 918 if a pressure of the hydraulic fluid in feed line exceeds a selected pressure.

The valve 908 includes a default closed position, a first open position, and a second open position. In the default position, the valve 906 prevents passage of hydraulic fluid to or from the first and second hydraulic cylinders 902 and 904. In the first open position, the valve 908 permits flow of hydraulic fluid from the feed line 910 to a first or rod end 920 of the second hydraulic cylinder 904 while hydraulic fluid in a second or piston end 922 of the first hydraulic valve 902 is permitted to pass through the first valve 908 to drain back to the reservoir 914 via the return line 912. As a result of the pressurized fluid being delivered to the first end 920, a piston 924 of the second hydraulic cylinder 904 is moved towards a second end 926 of the second hydraulic cylinder 904, resulting in retraction of the second hydraulic cylinder 904. Retraction of the second hydraulic cylinder 904 may result in a reduction in a length of the articulating arm.

As shown in FIG. 9, the second end 926 of the second hydraulic cylinder 904 is fluidically coupled to a first end 928 of the first hydraulic cylinder 902 via line 930. The line 930 provides for transfer of hydraulic fluid confined between the piston 924 of the second hydraulic cylinder 904 and a piston 932 of the first hydraulic cylinder 902. The hydraulic fluid confined between the pistons 924 and 932 is a constant volume. Displacement of the piston 924 pressurizes the confined hydraulic fluid causing displacement of the piston 932 toward the second end 922 of the first hydraulic cylinder 902. In turn, hydraulic fluid is forced out of the first hydraulic cylinder 902 at the second end 922 thereof, which passes through the valve 908 and returns to the reservoir 914 via the return line 912. Movement of the piston 932 towards to the second end 922 represents retraction of the first hydraulic cylinder 902, which may result in rotation of the articulating arm downwards. Consequently, movement of the valve 908 into the first open position results in simultaneous retraction of both the first and second hydraulic cylinders 902 and 904, which may represent simultaneous retraction and lowering of an articulating arm.

Movement of the valve 908 into the second open position permits pressurized fluid to flow into the second end 922 of the first hydraulic cylinder 902, which forces hydraulic fluid into the second end 926 of the second hydraulic cylinder 904. Additionally, hydraulic fluid is forced out of the first end 920 of the second hydraulic cylinder 904, is passed through the valve 908, and is returned to the reservoir 914 via the return line 912. Thus, movement of the valve 908 into the second open position results in simultaneous extension of both the first and second hydraulic cylinders 902 and 904, which may result in simultaneous raising and extension of the articulating arm.

Cycling of the valve 908 between the first open position and the second open position results in simultaneous lowering and retraction of the articulating arm and simultaneous raising and extension of the articulating arm in a repeated manner. Thus, cycling of the valve 908 between the first open position and the second open position may be used to form a negative rake angle in a silo face. Further, the system 900 may be operated without the use of a control system to coordinate operations of the first and second hydraulic cylinders. Rather, operation of the valve 908 is sufficient to cause simultaneous operation of the first and second hydraulic cylinders 902 and 904.

Further, in the illustrated example, the first and second hydraulic cylinders 902 and 904 are identical, which results in actuation of the first and second hydraulic cylinders 902 and 904 at the same rate. In other implementations, a size of the hydraulic cylinders 902 and 904 may be of different sizes, e.g., the pistons 924 and 932 may be sized differently. In such implementations, the rates at which the first hydraulic cylinder 902 and the second hydraulic cylinder 904 are actuated are different, which may be used to alter the relative rates at which the articulating arm is raised and lowered compared to the extension and retraction of the articulating arm.

Figure 10:
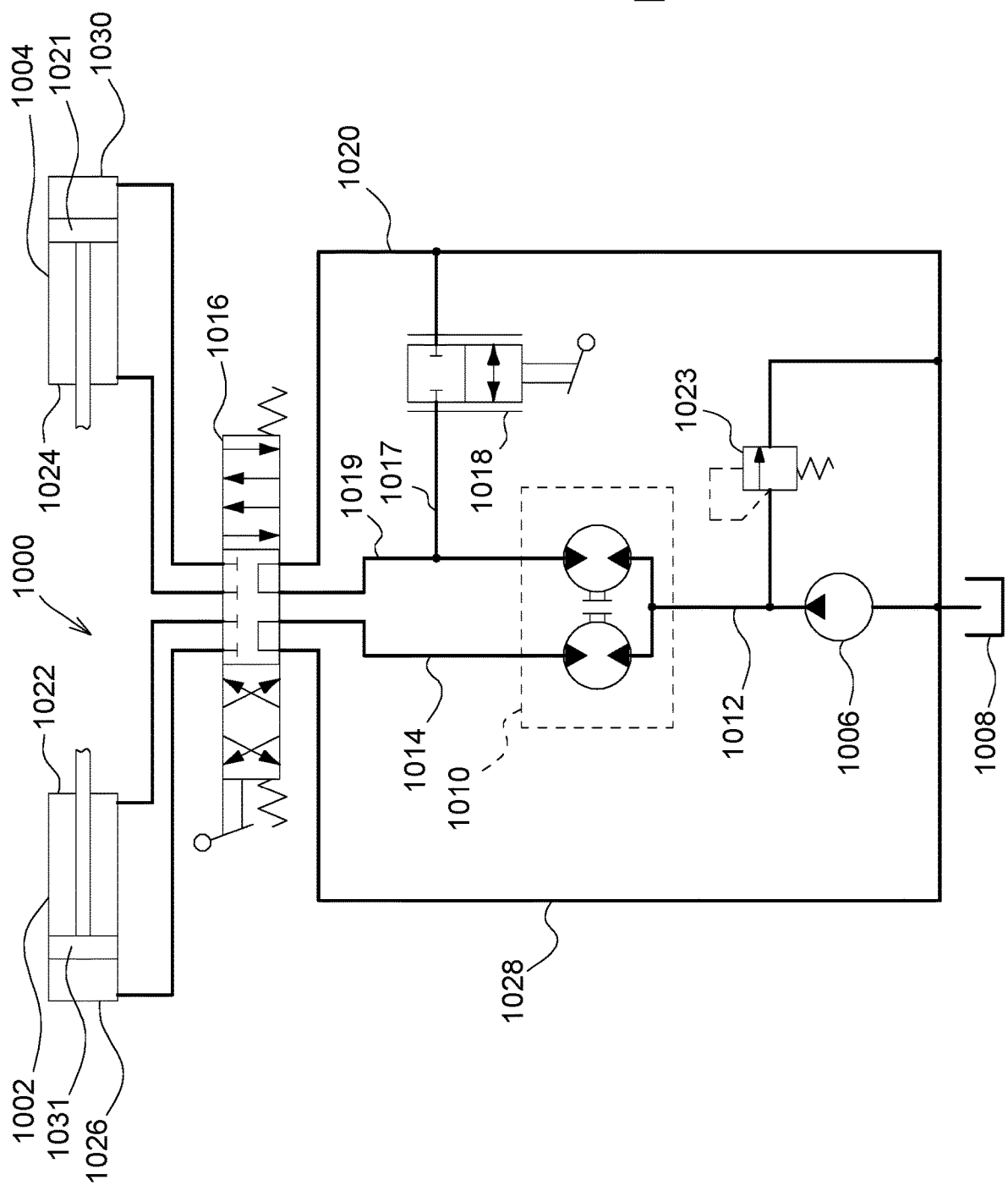
FIG. 10 a schematic diagram of another example system that may be used to operate an articulating arm to form a negative rake angle in a silo face of bulk silage, according to some implementations of the present disclosure.

FIG. 10 is a schematic diagram of another example system 1000 used for operating an articulating arm to form a negative rake angle in a silo face of bulk silage. Similar to the system 900 of FIG. 9, the system 1000 may be operated without the use of a control system to coordinate operations of first and second hydraulic cylinders used to raise and lower and extend and retract an articulating arm. However, a controller may be included to control operation of the system 1000, for example, to adjust a rate of actuation of one hydraulic cylinder relative to the other hydraulic cylinder, e.g., to control operation of a variable flow valve 1018, described in more detail below. Thus, the hydraulic cylinders of the system 1000 may operate at different rates, which may be used to adjust the rake angle formed in the silo face of the bulk silage. The system 1000 utilizes the variable flow valve 1018 to alter a flow rate of hydraulic fluid provided to one of the hydraulic cylinders, thereby altering the rate of actuation of one of the hydraulic cylinders relative to the other.

The system 1000 includes a first hydraulic cylinder 1002 and a second hydraulic cylinder 1004. The first hydraulic cylinder 1002 may be configured to raise or lower the articulating arm by pivoting the articulating arm about a pivot axis. The second hydraulic cylinder 1004 may be configured to extend and retract the articulating arm to alter a length of the articulating arm. The system 1000 also includes a pump 1006 that draws hydraulic fluid from a reservoir 1008 and pumps pressurized hydraulic fluid to a flow divider 1010 via a feed line 1012. In some implementations, the flow divider 1010 is a rotary flow divider. The flow divider 1010 divides the pressurized hydraulic fluid into two separate flows. One of the fluid flows travels in a feed line 1014 to a three-position mechanically operated valve 1016. In other implementations, the valve 1016 may be an electrically operated valve. For example, in some implementations, the valve 1016 may be a solenoid-operated valve. When the valve 1016 is in an open position, pressurized hydraulic fluid from the feed line 1014 is directed to the first hydraulic cylinder 1002. The second fluid flow travels through feed line 1019 to the valve 1016. When the valve 1016 is in an open position, the pressurized hydraulic fluid is directed to the second hydraulic cylinder 1004.

As mentioned earlier, the system 1000 also includes the variable flow valve 1018. In the illustrated example, the variable flow valve 1018 is mechanically actuated. For example, a lever may be used to selectively adjust a position of the valve 1018 to alter a size of an opening formed through the variable flow valve 1018. In other implementations, the valve 1018 may be an electrically operated valve. For example, in some implementations, the valve 1018 may be a solenoid-operated valve. The variable flow valve 1018 is disposed in fluid line 1017 that extends between and is in fluid communication with the feed line 1019 and a return line 1020. In a closed position, hydraulic fluid is prevented from passing through the variable flow valve 1018. Consequently, pressurized hydraulic fluid is prevented from passing from the feed line 1019 and into the return line 1020. As the variable flow valve 1018 opens, hydraulic fluid is permitted to pass into the return line 1020, which returns the hydraulic fluid to the reservoir 1008. As the variable flow vale 1018 continues to open, a size of a passage formed through the variable flow vale 1018 increases, which, in turn, permits a greater amount of hydraulic fluid to pass from the feed line 1019 to the return line 1020. Thus, as the amount by which the variable flow valve 1018 opens increases, a greater percentage of the pressurized fluid flow from the feed line is directed to the return line 1020, resulting in a diminished hydraulic fluid flow reaching the second hydraulic cylinder 1004. The variable flow valve 1018 is, therefore, operable to alter the rate at which the second hydraulic cylinder 1004 actuates due to the reduced fluid flow. Particularly, the variable flow valve 1018 is operable to change the rate at which a piston 1021 in the second hydraulic cylinder 1004 is displaced. As a result, by altering how much the variable flow valve 1018 is open, the variable flow valve 1018 functions to cause the first and second hydraulic cylinders 1002 and 1004 to actuate at different rates.

The system 1000 also includes a pressure-relief valve 1023. The pressure-relief valve 1023 opens to return hydraulic fluid to the reservoir 1008 via the return line 1020 if a pressure of the hydraulic fluid in feed line exceeds a selected pressure.

The valve 1016 includes a default closed position, a first open position, and a second open position. In the closed position, the valve 1016 prevents passage of the pressurized hydraulic fluid to the first and second hydraulic cylinder 1002 and 1004. In the first open position, the valve 1016 directs pressurized hydraulic fluid from the feed line 1014 to a first or rod end 1022 of the first hydraulic cylinder 1002 and directs hydraulic fluid from the feed line 1019 to a first or rod end 1024 of the second hydraulic cylinder 1004. Also, in the first open position, the valve 1016 directs hydraulic fluid from a second or piston end 1026 of the first hydraulic cylinder 1002 to a return line 1028, which returns hydraulic fluid to the reservoir 1008. Similarly, the valve 1016 directs hydraulic fluid from a second end 1030 of the second hydraulic cylinder 1004 to the return line 1020 and back to the reservoir 1008 when the valve 1016 is in the first open position. Thus, in the first open position, the pressurized hydraulic fluid causes the first and second hydraulic cylinders 1002 and 1004 to retract, moving pistons 1031 and 1021 towards the second ends 1026 and 1030 of the first and second hydraulic cylinders 1002 and 1004, respectively. With the system 1000 applied to an articulating arm, retraction of the first and second hydraulic cylinders 1002 and 1004 may result in simultaneous lowering and retraction of the articulating arm.

This combined actuation may be used to form a negative rake angel in a silo face of bulk silage. Further, altering a position of the variable flow valve 1018 may be used to change the rate at which the articulating arm is lowered relative to a rate at which the articulating arm is retracted to alter a slope formed in the silo face.

In the second open position, the valve 1016 directs pressurized hydraulic fluid from the feed line 1014 to the second end 1026 of the first hydraulic cylinder 1002 and hydraulic fluid from the first end 1022 of the first hydraulic cylinder 1002 to the return line 1028 and back to the reservoir 1008. Also, in the second open position, the valve 1016 directs pressurized hydraulic fluid from the feed line 1019 to the second end 1030 of the second hydraulic cylinder 1004 and hydraulic fluid from the first end 1024 of the second hydraulic cylinder 1004 to the return line 1020 and back to the reservoir 1008. In the second open position, the valve 1016 functions to extend both the first and second hydraulic cylinders 1002 and 1004, displacing the pistons 1031 and 1021 towards the first ends 1022 and 1024, respectively.

With the system 1000 applied to an articulating arm, the first and second hydraulic cylinders 1002 and 1004 are operable simultaneously to extend and raise the articulating arm. Simultaneous extension and retraction of the articulating arm may be used to form a negative rake angle in the silo face. Further, the rate at which the articulating arm is raised compared to a rate at which the articulating arm is extended may be altered by altering a position of the variable flow valve 1018, which alters rates at which the first and second hydraulic cylinders 1002 and 1004 are actuated, as described earlier.

Cycling of the valve 1016 between the first open position and the second open position results in simultaneous lowering and retraction of the articulating arm and simultaneous raising and extension of the articulating arm in a repeated manner. Thus, cycling of the valve 1016 between the first open position and the second open position may be used to form a negative rake angle in a silo face. Further, the system 1000 may be operated without the use of a control system to coordinate operations of the first and second hydraulic cylinders. Rather, operation of the valve 1016 is sufficient to cause simultaneous operation of the first and second hydraulic cylinders 1002 and 1004.

Further, in the illustrated example, the first and second hydraulic cylinders 1002 and 1004 are identical, which results in actuation of the first and second hydraulic cylinders 1002 and 1004 at the same rate when the variable flow valve 1018 is in the closed position. In other implementations, a size of the hydraulic cylinders 1002 and 1004 may be of different sizes, e.g., the pistons 1021 and 1030 may be sized differently. In such implementations, the rates at which the first hydraulic cylinder 1002 and the second hydraulic cylinder 1004 are actuated are different rates, which may be used to alter the relative rates at which the articulating arm is raised and lowered compared to the rate at which the articulating arm is extended and retracted.

Figure 11:
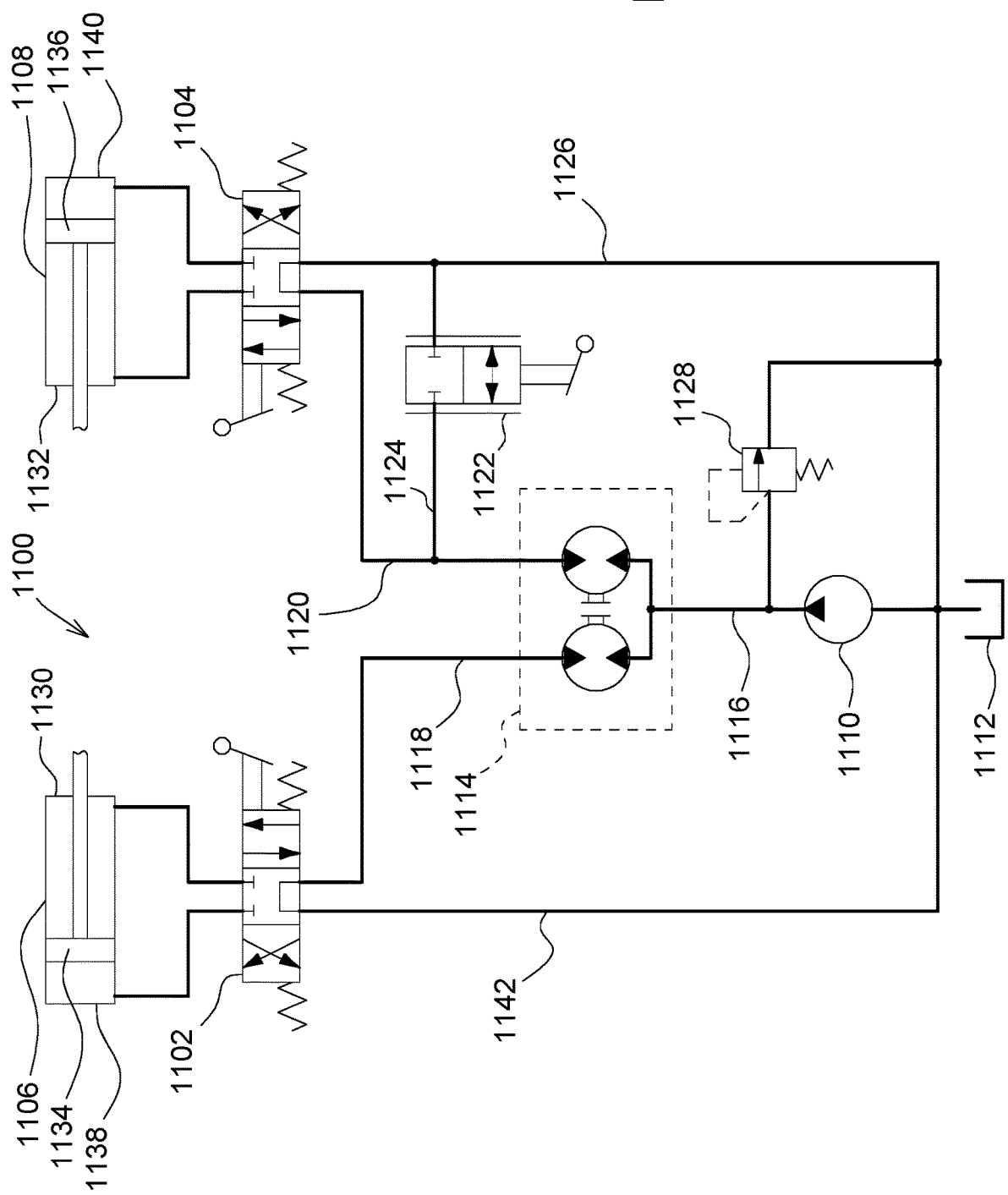
FIG. 11 is a schematic diagram of another example hydraulic system that may be used to operate an articulating arm to form a negative rake angle in a silo face of bulk silage, according to some implementations of the present disclosure.

FIG. 11 shows a schematic diagram of another example hydraulic system 1100. The system is similar to system 1000 except that system 1100 utilizes two, three-position mechanically operated valves 1102 and 1104 that are linked to cause simultaneous actuation of two hydraulic cylinders 1106 and 1108. For example, the valves 1102 and 1104 may be mechanically linked, such as by a mechanical linkage that transmits actuation of one of the valves to the other of the valves. Other types of couplings, such as a push-pull cable, are also within the scope of the present disclosure. In other implementations, the valves 1102 and 1104 may be electrically operated valves. For example, in some implementations, the valves 1102 and 1104 may be solenoid-operated valves. Similar to the system 900 and 1000 of FIGS. 9 and 10, respectively, the system 1100 may be operated without the use of a control system to coordinate operations of first and second hydraulic cylinders used to raise and lower and extend and retract an articulating arm. However, a controller may be included to control operation of the system 1100, for example, to adjust a rate of actuation of one hydraulic cylinder relative to the other hydraulic cylinder, e.g., to control operation of a variable flow valve 1122, described in more detail below.

The system 1100 includes the first hydraulic cylinder 1106 and the second hydraulic cylinder 1108. The first hydraulic cylinder 1106 may be configured to raise or lower the articulating arm by pivoting the articulating arm about a pivot axis. The second hydraulic cylinder 1108 may be configured to extend and retract the articulating arm to alter a length of the articulating arm. The system 1100 also includes a pump 1110 that draws hydraulic fluid from a reservoir 1112 and pumps pressurized hydraulic fluid to a flow divider 1114 via a feed line 1116. In some implementations, the flow divider 1114 is a rotary flow divider. The flow divider 1114 divides the pressurized hydraulic fluid into two separate flows. One of the fluid flows travels in a feed line 1118 to the first three-position solenoid-operated valve 1102, which directs the pressurized hydraulic fluid to the first hydraulic cylinder 1106. The second fluid flow travels through feed line 1120 to the second three-position solenoid-operated valve 1104, which directs the pressurized hydraulic fluid to the second hydraulic cylinder 1108.

The system 1100 also includes a variable flow valve 1122. The variable flow valve 1122 is disposed in fluid line 1124 that extends between and is in fluid communication with the feed line 1120 and a return line 1126. In the illustrated example, the variable flow valve 1122 is mechanically actuated, such as with the use of a lever, to selectively adjust a position of the valve 1122 to alter a size of an opening formed through the variable flow valve 1122. In other implementations, the variable flow valve 1122 may be an electrically operated valve. For example, in some implementations, the variable flow valve 1122 may be a solenoid-operated valve The variable flow valve 1122 operates to redirect a portion of the hydraulic fluid flow from feeder line 1120, which, in turn, alters a rate of actuation of the second hydraulic cylinder 1108 compared to a rate of actuation of the first hydraulic cylinder 1106. The variable flow valve 1122 operates identically to the variable flow valve 1018 of FIG. 10. As such, further description of the variable flow valve 1122 is omitted.

The system 1100 also includes a pressure-relief valve 1128. The pressure-relief valve 1128 opens to return hydraulic fluid to the reservoir 1112 from the feeder line 1120 via the return line 1126 if a pressure of the hydraulic fluid in feed line exceeds a selected pressure.

Each of the valves 1102 and 1104 have a default closed position, a first open position, and a second open position. The valves 1102 and 1104 are synchronized, for example, by a mechanical connection that provides simultaneous actuation of both valves 1102 and 1104. Consequently, when one of the first valve 1102 or the second valve 1104 is positioned into the first open position, the other of the first valve 1102 or the second valve 1104 is also positioned into the first open position, for example. In other implementations, movement of one of the valves 1102 and 1004 into the first open position results in movement of the other of the valves 1102 and 1104 into the second open position.

In the illustrated example, when the first valve 1106 is moved leftwards in the context of the FIG. 11 into the first open position, the second valve 1108 is moved rightwards into the first open position. In the first open position, pressurized hydraulic fluid from the feed line 1118 is directed to a first or rod end 1130 of the first hydraulic valve 1106, and the pressurized hydraulic fluid from the feed line 1120 is directed to a first end 1132 of the second hydraulic cylinder 1108. Additionally, hydraulic fluid from a second or piston end 1138 is directed to a return line 1142 and back to the reservoir 1112, and hydraulic fluid from the second end 1140 is directed to the return line 1126 and back to the reservoir 1112. As a result, pistons 1134 and 1136 of the first and second hydraulic cylinders 1106 and 1108, respectively, are displaced towards opposing second or piston end 1138 and 1140, respectively, and the first and second hydraulic cylinders 1106 and 1108 are simultaneously retracted.

With the system 1100 applied to an articulating arm, retraction of the first and second hydraulic cylinders 1106 and 1108 may result in simultaneous lowering and retraction of the articulating arm. This combined actuation may be used to form a negative rake angel in a silo face of bulk silage. Further, altering a position of the variable flow valve 1122 may be used to change the rate at which the articulating arm is lowered relative to a rate at which the articulating arm is retracted to alter a slope formed in the silo face.

Movement of one of the first valve 1102 or the second valve 1104 into the second open position causes simultaneous movement of the other of the first valve 1102 or the second valve 1104 into the second open position because of the mechanical connection. In the second open position, the valve 1102 directs pressurized hydraulic fluid from the feed line 1118 to the second end 1138 of the first hydraulic cylinder 1106 and hydraulic fluid from the first end 1130 of the first hydraulic cylinder 1106 to the return line 1142 and back to the reservoir 1112. Also, in the second open position, the valve 1104 directs pressurized hydraulic fluid from the feed line 1120 to the second end 1140 of the second hydraulic cylinder 1108 and hydraulic fluid from the first end 1132 of the second hydraulic cylinder 1108 to the return line 1126 and back to the reservoir 1112.

In the second open position, the valves 1102 and 1104 functions to extend both the first and second hydraulic cylinders 1106 and 1108, displacing the pistons 1134 and 1136 towards the first ends 1130 and 1132, respectively. With the system 1100 applied to an articulating arm, the first and second hydraulic cylinders 1106 and 1108 are operable simultaneously to extend and raise the articulating arm. Simultaneous extension and raising of the articulating arm may be used to form a negative rake angle in the silo face. Further, the rate at which the articulating arm is raised compared to a rate at which the articulating arm is extended may be altered by altering a position of the variable flow valve 1122, which alters the rates at which the first and second hydraulic cylinders 1106 and 1108 are actuated, as described earlier.

Further, in the illustrated example, the first and second hydraulic cylinders 1106 and 1108 are identical, which results in actuation of the first and second hydraulic cylinders 1106 and 1108 at the same rate when the variable flow valve 1122 is in the closed position. In other implementations, a size of the hydraulic cylinders 1106 and 1108 may be of different sizes, e.g., the pistons 1134 and 1136 may be sized differently. In such implementations, the rates at which the first hydraulic cylinder 1106 and the second hydraulic cylinder 1108 are actuated at different rates, which may be used to alter the relative rates at which the articulating arm is raised and lowered compared to the rate at which the articulating arm is extended and retracted.

Figure 12:
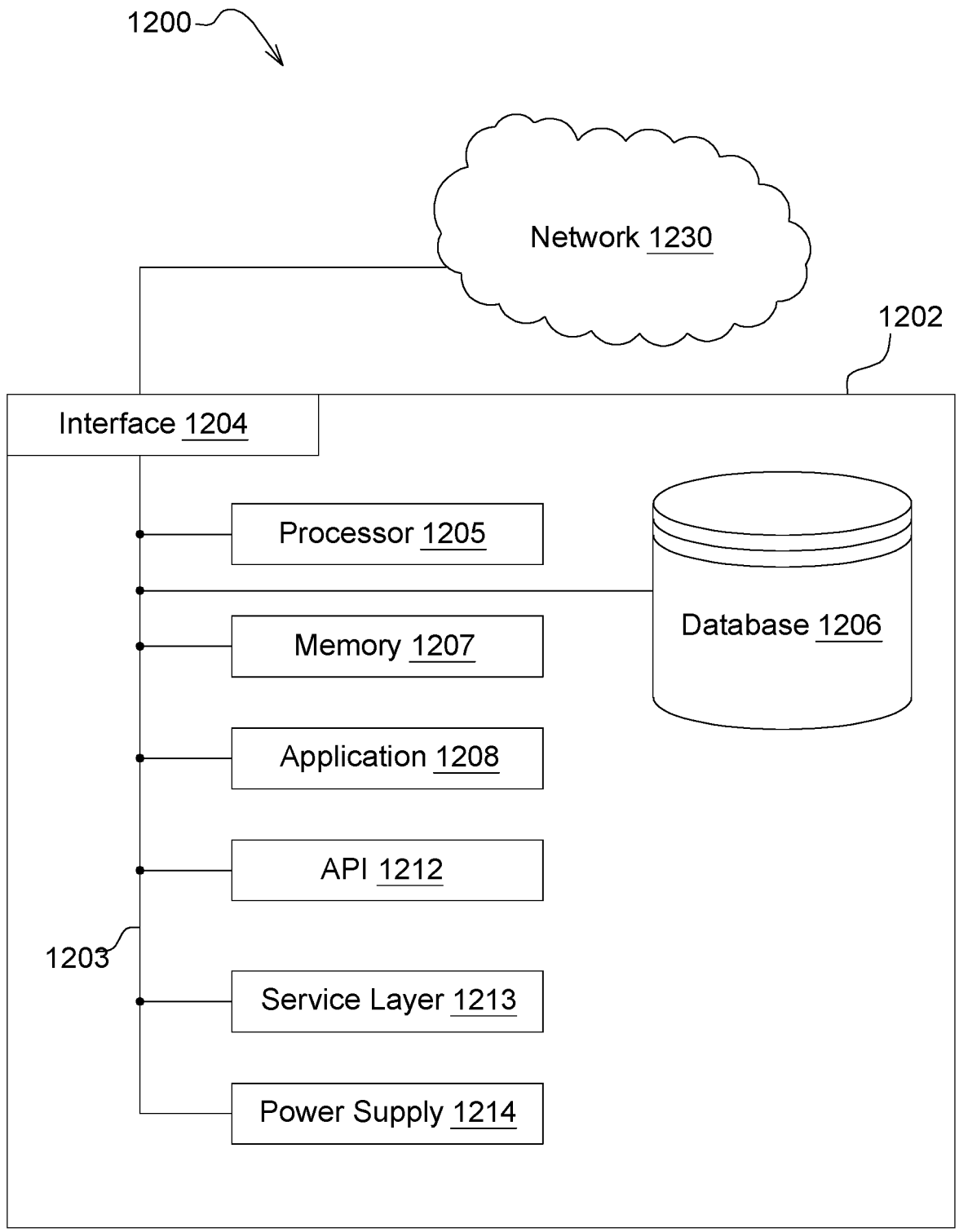
FIG. 12 is a block diagram illustrating an example computer system used to provide computational functionalities associated with described algorithms, methods, functions, processes, flows, and procedures as described in the present disclosure, according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a high level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both), over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Described implementations of the subject matter can include one or more features, alone or in combination.

For example, in a first implementation, a computer-implemented method, includes engaging a defacer with a silo face of a bulk material and displacing the defacer to move across the silo face of the bulk material to define a negative rake angle in the silo face.

The foregoing and other described implementations can each, optionally, include one or more of the following features:

A first feature, combinable with any of the following features, the method further including receiving a selected angle, and wherein displacing the defacer to move across the silo face of the bulk material to define a negative rake angle in the silo face includes forming the negative rake angle in the silo face having the selected angle.

A second feature, combinable with any of the previous or following features, wherein the defacer is coupled to an end of an articulating arm of a machine.

A third feature, combinable with any of the previous or following features, wherein engaging a defacer with a silo face of a bulk material includes at least one of extending the articulating arm until contact between the defacer and the silo face is detected or advancing the machine unit contact between the defacer and the silo face is detected.

A fourth feature, combinable with any of the previous or following features, wherein displacing the defacer to move across the silo face of the bulk material to define the silo face to have a negative rake angle includes, with the use of a controller, one of raising the articulating arm while simultaneously extending the articulating arm and lowering the articulating arm while simultaneously retracting the articulating arm to define the negative rake angle.

A fifth feature, combinable with any of the previous or following features, wherein raising the arm includes pivoting the arm relative to a body of the machine away from a horizontal position and towards a vertical position and wherein lowering the arm includes pivoting the articulating arm relative to the body of the machine away from a vertical position and towards a horizontal position.

A sixth feature, combinable with any of the previous or following features, wherein displacing the defacer to move across the silo face of the bulk material to define a negative rake angle includes, with the use of a controller, simultaneously moving the machine relative to the silo face in combination with pivoting the articulating arm to cause the defacer to move across the silo face of the bulk material to define the negative rake angle in the silo face.

A seventh feature, combinable with any of the previous or following features, wherein moving the machine relative to the silo face in combination with pivoting the articulating arm to cause the defacer to move across the silo face of the bulk material to define the negative rake angle in the silo face includes one of operating a drive system of the machine to advance the machine towards the silo face while simultaneously raising the articulating arm or operating the drive system of the machine to withdraw the machine from the silo face while simultaneously lowering the articulating arm to form the negative rake angle in the silo face of the bulk material.

An eighth feature, combinable with any of the previous or following features, the method further including collecting bulk material removed while defining the negative rake angle in the silo face.

A ninth feature, combinable with any of the previous or following features, wherein displacing the defacer to move across the silo face of the bulk material to define a negative rake angle in the silo face includes detecting a position of the defacer relative to the silo face of the bulk material.

A tenth feature, combinable with any of the previous features, wherein detecting a position of the defacer relative to the silo face of the bulk material includes computing a position of the defacer using sensed position information of the machine relative to the silo face received from a position sensor, sensed rotation information of an amount of rotation of the articulating arm from a rotation sensor, or sensed length information of the articulating arm representing an amount by which the articulating arm is extended or retracted from a length sensor.

In a second implementation, a non-transitory, computer-readable medium storing one or more instructions executable by a computer system to perform operations including engaging a defacer with a silo face of a bulk material and displacing the defacer to move across the silo face of the bulk material to define a negative rake angle in the silo face.

The foregoing and other described implementations can each, optionally, include one or more of the following features:

A first feature, combinable with any of the following features, the non-transitory, computer-readable medium further including one or more instructions executable by a computer system to perform operations including receiving a selected angle, and wherein displacing the defacer to move across the silo face of the bulk material to define a negative rake angle in the silo face includes forming the negative rake angle in the silo face having the selected angle.

A second feature, combinable with any of the previous or following features, wherein the defacer is coupled to an end of an articulating arm of a machine.

A third feature, combinable with any of the previous or following features, wherein engaging a defacer with a silo face of a bulk material includes at least one of extending the articulating arm until contact between the defacer and the silo face is detected or advancing the machine unit contact between the defacer and the silo face is detected.

A fourth feature, combinable with any of the previous or following features, wherein displacing the defacer to move across the silo face of the bulk material to define the silo face to have a negative rake angle includes, with the use of a controller, one of raising the articulating arm while simultaneously extending the articulating arm and lowering the articulating arm while simultaneously retracting the articulating arm to define the negative rake angle.

A fifth feature, combinable with any of the previous or following features, wherein raising the arm includes pivoting the arm relative to a body of the machine away from a horizontal position and towards a vertical position and wherein lowering the arm includes pivoting the articulating arm relative to the body of the machine away from a vertical position and towards a horizontal position.

A sixth feature, combinable with any of the previous or following features, wherein displacing the defacer to move across the silo face of the bulk material to define a negative rake angle includes, with the use of a controller, simultaneously moving the machine relative to the silo face in combination with pivoting the articulating arm to cause the defacer to move across the silo face of the bulk material to define the negative rake angle in the silo face.

A seventh feature, combinable with any of the previous or following features, wherein moving the machine relative to the silo face in combination with pivoting the articulating arm to cause the defacer to move across the silo face of the bulk material to define the negative rake angle in the silo face includes one of operating a drive system of the machine to advance the machine towards the silo face while simultaneously raising the articulating arm or operating the drive system of the machine to withdraw the machine from the silo face while simultaneously lowering the articulating arm to form the negative rake angle in the silo face of the bulk material.

An eighth feature, combinable with any of the previous or following features, the non-transitory, computer-readable medium further including one or more instructions executable by a computer system to perform operations including collecting bulk material removed while defining the negative rake angle in the silo face.

A ninth feature, combinable with any of the previous or following features, wherein displacing the defacer to move across the silo face of the bulk material to define a negative rake angle in the silo face includes detecting a position of the defacer relative to the silo face of the bulk material.

A tenth feature, combinable with any of the previous features, wherein detecting a position of the defacer relative to the silo face of the bulk material includes computing a position of the defacer using sensed position information of the machine relative to the silo face received from a position sensor, sensed rotation information of an amount of rotation of the articulating arm from a rotation sensor, or sensed length information of the articulating arm representing an amount by which the articulating arm is extended or retracted from a length sensor.

In a third implementation, a computer-implemented system including one or more processors and a non-transitory computer-readable storage medium coupled to the one or more processors and storing programming instructions for execution by the one or more processors, the programming instructions instructing the one or more processors to engage a defacer with a silo face of a bulk material and displace the defacer to move across the silo face of the bulk material to define a negative rake angle in the silo face.

The foregoing and other described implementations can each, optionally, include one or more of the following features:

A first feature, combinable with any of the following features, the programming instructions including programming instructions instructing to the one or more processors to receive a selected angle, and wherein displacing the defacer to move across the silo face of the bulk material to define a negative rake angle in the silo face includes forming the negative rake angle in the silo face having the selected angle.

A second feature, combinable with any of the previous or following features, wherein the defacer is coupled to an end of an articulating arm of a machine.

A third feature, combinable with any of the previous or following features, wherein engaging a defacer with a silo face of a bulk material includes at least one of extending the articulating arm until contact between the defacer and the silo face is detected or advancing the machine unit contact between the defacer and the silo face is detected.

A fourth feature, combinable with any of the previous or following features, wherein displacing the defacer to move across the silo face of the bulk material to define the silo face to have a negative rake angle includes, with the use of a controller, one of raising the articulating arm while simultaneously extending the articulating arm and lowering the articulating arm while simultaneously retracting the articulating arm to define the negative rake angle.

A fifth feature, combinable with any of the previous or following features, wherein raising the arm includes pivoting the arm relative to a body of the machine away from a horizontal position and towards a vertical position and wherein lowering the arm includes pivoting the articulating arm relative to the body of the machine away from a vertical position and towards a horizontal position.

A sixth feature, combinable with any of the previous or following features, wherein displacing the defacer to move across the silo face of the bulk material to define a negative rake angle includes, with the use of a controller, simultaneously moving the machine relative to the silo face in combination with pivoting the articulating arm to cause the defacer to move across the silo face of the bulk material to define the negative rake angle in the silo face.

A seventh feature, combinable with any of the previous or following features, wherein moving the machine relative to the silo face in combination with pivoting the articulating arm to cause the defacer to move across the silo face of the bulk material to define the negative rake angle in the silo face includes one of operating a drive system of the machine to advance the machine towards the silo face while simultaneously raising the articulating arm or operating the drive system of the machine to withdraw the machine from the silo face while simultaneously lowering the articulating arm to form the negative rake angle in the silo face of the bulk material.

An eighth feature, combinable with any of the previous or following features, the programming instructions including programming instructions instructing to the one or more processors to collect bulk material removed while defining the negative rake angle in the silo face.

A ninth feature, combinable with any of the previous or following features, wherein displacing the defacer to move across the silo face of the bulk material to define a negative rake angle in the silo face includes detecting a position of the defacer relative to the silo face of the bulk material.

A tenth feature, combinable with any of the previous features, wherein detecting a position of the defacer relative to the silo face of the bulk material includes computing a position of the defacer using sensed position information of the machine relative to the silo face received from a position sensor, sensed rotation information of an amount of rotation of the articulating arm from a rotation sensor, or sensed length information of the articulating arm representing an amount by which the articulating arm is extended or retracted from a length sensor.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Without in any way limiting the scope, interpretation, or application of the claims appearing below, a technical effect of one or more of the example implementations disclosed herein is to improve safety and stability associated with bulk silage, particularly bulk silage contained in a bunker silo, by forming the silo face to have a negative rake angle.

While the above describes example implementations of the present disclosure, these descriptions should not be viewed in a limiting sense. Rather, other variations and modifications may be made without departing from the scope and spirit of the present disclosure.

What is claimed is:

1. A system for forming a silo face of a bulk material with a negative rake angle, the system comprising:
   a machine comprising:
      a frame; and
      an articulating arm comprising:
         a first portion pivotably coupled to the frame;
         a second portion telescopingly engaged with the first portion;
   a defacer coupled to a distal end of the articulating arm; and
   a controller communicably coupled to the machine and configured to telescopingly extend or retract the second portion of the articulating arm relative to the first portion of the articulating arm while simultaneously pivoting the first portion of the articulating arm relative to the frame to define a negative rake angle.

2. The system of claim 1, further comprising a first sensor configured to sense a pivoting angle of the first portion of the articulating arm and a second sensor configured to sense an amount of extension of the second portion of the articulating arm relative to the first portion of the articulating arm, and wherein the controller is configured to control an amount of pivoting of the first portion of the articulating arm using the sensed pivoting angle from the first sensor and configured to control an amount of extension of the second portion of the articulating arm relative to the first portion of the articulating arm using the sensed amount of extension from the second sensor.

3. The system of claim 1, wherein the machine further comprises a drive system configured to move the machine along a surface, and wherein the controller is configured to simultaneously operate the drive system to move the machine along the surface and pivot the articulating arm to define the negative rake angle.

4. The system of claim 1, further comprising a sensor configured to detect a position of the machine relative to an object, and wherein the controller is configured to operate the drive system to move the machine relative to the object using the position information from the sensor.

5. The system of claim 4, wherein the controller is configured to at least one of simultaneously pivot the first portion of the articulating arm to raise the articulating arm and control the drive system to advance the machine towards the object and simultaneously pivot the first portion of the articulating arm to lower the articulating arm and control the drive system to withdraw the machine from the object to form the negative rake angle.

\* \* \* \* \*